US011870190B2

(12) United States Patent
Hopkinson

(10) Patent No.: US 11,870,190 B2
(45) Date of Patent: Jan. 9, 2024

(54) ANTI-ARC CONNECTOR AND PIN ARRAY FOR A PORT

(71) Applicant: CommScope Technologies LLC, Hickory, NC (US)

(72) Inventor: Wayne C. Hopkinson, Hickory, NC (US)

(73) Assignee: CommScope Technologies LLC, Hickory, NC (US)

(*) Notice: Subject to any disclaimer, the term of this patent is extended or adjusted under 35 U.S.C. 154(b) by 273 days.

(21) Appl. No.: 17/363,863

(22) Filed: Jun. 30, 2021

(65) Prior Publication Data

US 2021/0328393 A1 Oct. 21, 2021

Related U.S. Application Data

(63) Continuation of application No. PCT/US2020/015888, filed on Jan. 30, 2020.

(60) Provisional application No. 62/869,105, filed on Jul. 1, 2019, provisional application No. 62/799,692, filed on Jan. 31, 2019.

(51) Int. Cl.

| | |
|---|---|
| ***H01R 24/64*** | (2011.01) |
| ***H01R 13/639*** | (2006.01) |
| ***H01R 13/713*** | (2006.01) |
| ***H01R 13/74*** | (2006.01) |

(52) U.S. Cl.

CPC ........... *H01R 24/64* (2013.01); *H01R 13/639* (2013.01); *H01R 13/7135* (2013.01); *H01R 13/743* (2013.01)

(58) Field of Classification Search

CPC ....... H01R 24/64; H01R 13/639; H01R 13/03

See application file for complete search history.

(56) References Cited

U.S. PATENT DOCUMENTS 4,274,691 A * 6/1981 Abernethy ......... H01R 13/7032 439/701
4,431,246 A 2/1984 Vaden
5,975,936 A 11/1999 Lin et al.
6,402,560 B1 6/2002 Lin (Continued)

FOREIGN PATENT DOCUMENTS

EP 1 826 879 A1 8/2007

*Primary Examiner* — Neil Abrams

(74) *Attorney, Agent, or Firm* — Muncy, Geissler, Olds & Lowe, P.C.

(57) ABSTRACT

To reduce sparks and arcing if an RJ plug is removed from an RJ jack while a PoE signal is present, the jack includes contact terminals for making electrical contact with blades of the plug. At least two primary contact terminals have first engagement portions positioned a first distance from the opening. At least one secondary and/or tertiary contact terminal has a second and/or third engagement portion, which is positioned less than the first distance from the opening. The engagement portions are the last portions of the contact terminals to make electrical contact with corresponding blades of the plug upon removal of the plug. At least one of the first engagement portions is formed of a first material different from a second material used to form at least one of the second or third engagement portions. One of the materials is formed to resist damage from sparks better than the other material. By this system, an RJ jack would not have all of the contact terminals formed to resist damage from sparks and arcing.

20 Claims, 15 Drawing Sheets

(56) References Cited

U.S. PATENT DOCUMENTS

| | | | | |
|---|---|---|---|---|
| 6,790,097 | B1 * | 9/2004 | Edwards | H01R 13/6485 439/676 |
| 7,264,516 | B2 | 9/2007 | Hashim et al. | |
| 7,367,849 | B2 * | 5/2008 | Wang | H01R 13/6466 439/676 |
| 7,431,600 | B2 * | 10/2008 | Kozak | H01R 24/64 439/924.1 |
| 7,467,960 | B1 | 12/2008 | Harlan et al. | |
| 7,972,183 | B1 | 7/2011 | Lin | |
| 8,951,072 | B2 | 2/2015 | Hashim et al. | |
| 9,054,460 | B2 | 6/2015 | Schumacher et al. | |
| 9,083,096 | B2 | 7/2015 | Tobey | |
| 9,391,405 | B1 | 7/2016 | Wu | |
| 9,531,135 | B2 | 12/2016 | Gatnau Navarro et al. | |
| 9,537,273 | B2 | 1/2017 | Tobey | |
| 9,985,373 | B2 * | 5/2018 | Chen | H01R 13/6466 |
| 11,552,431 | B2 * | 1/2023 | Lee | H01R 13/6485 |
| 2008/0311797 | A1 | 12/2008 | Aekins | |
| 2021/0328393 | A1 * | 10/2021 | Hopkinson, Jr. | H01R 13/743 |

* cited by examiner

ANTI-ARC CONNECTOR AND PIN ARRAY FOR A PORT

This application is a continuation of International Application No. PCT/US2020/015888, filed Jan. 30, 2020, which claims the benefit of U.S. Provisional Application No. 62/869,105, filed Jul. 1, 2019, and U.S. Provisional Application No. 62/799,692, filed Jan. 31, 2019, all of which are herein incorporated by reference.

BACKGROUND OF THE INVENTION

1. Field of the Invention

The present invention relates to a jack and plug. More particularly, the present invention relates to a jack, such as an RJ-45, having improved electrical contacts within the jack to resist damage during unmating of a plug when a Power over Ethernet (PoE) signal is present. The present invention also relates to a plug, such as an RJ45 plug, having improved conductive blades to resist damage during unmating when a PoE signal is present.

2. Description of the Related Art

Computers, fax machines, printers and other electronic devices are routinely connected by communication cables to network equipment such as routers, switches, servers and the like. FIG. 1 illustrates the manner in which a portable hard drive 10 may be connected to a network device 30 (e.g., a network switch) using conventional communications plug/jack connections. As shown in FIG. 1, the portable hard drive 10 is connected by a patch cord 11 to a communications jack 20 that is mounted in a wall plate 18.

The patch cord 11 comprises a communications cable 12 that contains a plurality of individual conductors (e.g., eight insulated copper wires) and first and second communications plugs 13, 14 that are attached to the respective ends of the cable 12. The first communications plug 13 is inserted into a plug aperture of a communications jack (not shown) that is provided in the portable hard drive 10, and the second communications plug 14 is inserted into a plug aperture 22 in the front side of the communications jack 20 and retained therein by a latch 9 of the second communications plug 14. The contacts or "blades" of the second communications plug 14 are exposed through the slots 15 on the top and front surfaces of the second communications plug 14 and mate with respective "jackwire" contacts of the communications jack 20. The blades of the first communications plug 13 similarly mate with respective jackwire contacts of the communications jack (not shown) that is provided in the portable hard drive 10.

The communications jack 20 includes a back-end wire connection assembly 24 that receives and holds insulated conductors from a cable 26. As shown in FIG. 1, each conductor of cable 26 is individually pressed into a respective one of a plurality of slots provided in the back-end wire connection assembly 24 to establish mechanical and electrical connection between each conductor of cable 26 and a respective one of a plurality of conductive paths leading to the jackwires of the communications jack 20. The other end of each conductor in cable 26 may be connected to, for example, the network device 30.

The wall plate 18 is typically mounted on a wall (not shown) of a room of, for example, an office building, and the cable 26 typically runs through conduits in the walls and/or ceilings of the office building to a room in which the network device 30 is located. The patch cord 11, the communications jack 20 and the cable 26 provide a plurality of signal transmission paths over which information signals may be communicated between the portable hard drive 10 and the network device 30. It will be appreciated that typically one or more patch panels, along with additional communications cabling, would be included in the communications path between the cable 26 and the network device 30. However, for ease of description, in FIG. 1, the cable 26 is shown as being directly connected to the network device 30.

In the above-described communications system, the information signals that are transmitted between the portable hard drive 10 and the network device 30 are typically transmitted over twisted pairs of conductors (sometimes referred to as "differential pairs" or simply "pairs") rather than over single conductors. An information signal is transmitted over a differential pair by transmitting signals on each conductor of the pair that have equal magnitudes, but opposite phases, where the signals transmitted on the two conductors of the pair are selected such that the information signal is the voltage difference between the two transmitted signals. The use of differential signaling can greatly reduce the impact of noise on the information signal.

Various industry standards, such as the TIA/EIA-568-B.2-1 standard approved Jun. 20, 2002 by the Telecommunications Industry Association, have been promulgated that specify configurations, interfaces, performance levels and the like that help ensure that jacks, plugs and cables that are produced by different manufacturers will all work together. By way of example, the TIA/EIA-568-C.2 standard (August 2009) is designed to ensure that plugs, jacks and cable segments that comply with the standard will provide certain minimum levels of performance for signals transmitted at frequencies of up to 500 MHz.

Most of these industry standards specify that each jack, plug and cable segment in a communications system must include eight conductors 1-8 that are arranged as four differential pairs of conductors. The industry standards specify that, in at least the connection region where the contacts (blades) of a plug mate with the jackwire contacts of the jack (referred to herein as the "plug-jack mating region"), the eight contacts in the plug are generally aligned in a row, as are the corresponding eight contacts in the jack. As shown in FIG. 2, which schematically illustrates the positions of the jackwire contacts of a jack in the plug-jack mating region, under the widely used TIA/EIA 568 type B configuration, in which conductors 4 and 5 comprise differential pair 1, conductors 1 and 2 comprise differential pair 2, conductors 3 and 6 comprise differential pair 3, and conductors 7 and 8 comprise differential pair 4. As known to those of skill in the art, conductors 1, 3, 5 and 7 comprise "tip" conductors, and conductors 2, 4, 6 and 8 comprise "ring" conductors.

Power over Ethernet (PoE) is a system whereby electrical power is transmitted to devices over the same twisted pair network cable used to transmit and receive communication signals. Previously, a dedicated power cable was attached to a dedicated power port on the device, e.g., the portable hard drive 10. With a PoE system, the dedicated power cable and power port are no longer needed, as power from a DC power source 32 is provided via the same connection port handling the communication signaling, e.g., a typical RJ45 communications jack 20. The DC power is transmitted through the patch cord 11 using one or more of the twisted pairs within the patch cord 11 to the device, e.g., portable hard drive 10.

There are several PoE standards, such as alternative A, Alternative B, and 4PPoE. In some instances, two or the four twisted pairs transmit power, e.g., Alternative B has the 4-5 jackwire pair carrying the positive voltage and the 7-8 jackwire pair carrying the negative, while the 1-2 and 3-6 jackwire pairs are used for communication signaling. It is also possible to have non-standard or proprietary systems wherein two or even three wires carry power to the device. In other instances, all of the twisted pairs carry power signals. For example, in the standard of IEEE 802.3bt, the 4-5 jackwire pair and the 1-2 jackwire pair are connected to a positive terminal of the DC power source 32 via the cable 26. The 3-6 jackwire pair and the 7-8 jackwire pair are connected to a negative terminal of the DC power source 32 via the cable 26. The 1-2 jackwire pair and the 3-6 jackwire pair are also used for communication signaling in combination with the power transmission. The 4-5 jackwire pair and the 7-8 jackwire pair are used solely for power transmission. The connections for IEEE 802.3bt are summarized in Table 1 below and shown schematically in FIG. 3.

TABLE 1

| Cable | Connector Jackwires | Colors | Power |
|---|---|---|---|
| Pair 1 | 45 | Blue/white | TX (+) |
| Pair 2 | 12 | Orange/white | TX (+) |
| Pair 3 | 36 | Green/white | RX (−) |
| Pair 4 | 78 | Brown/white | RX (−) |

For IEEE 802.3bt, the power level is quite significant. Ninety (90) watts of power may be transmitted from the communications jack 20 to the electronic device connected to the network, e.g., the portable hard drive 10. The minimum port voltage could be set to 52 volts DC. At 52 volts, the maximum amperage would be 1.73 amps. The amps would be split equally between the insulated wires forming the twisted pairs in the patch cord 11. In other words, each of the insulated wires would be carrying about 0.433 amps. The voltage is allowed to increase up to about 57 volts, however, the total wattage should not exceed 90 watts. Therefore, at 57 volts, the patch cord would be carrying a maximum of about 1.58 amps, meaning that each of the insulated wires would be carrying about 0.395 amps.

Often times PoE devices are connected to networks within a business or home. During the course of the workday, the PoE device may be moved from one room to another, e.g., a network-connected display or projector may be moved from an office to a conference room to make a presentation. After the workday at the office, an employee may disconnect a PoE device, e.g., and the network-connected, portable hard drive 10, to take the PoE device home to continue working on a project.

The PoE device may be disconnected by removing the second plug 14 from the communications jack 20 in the wall plate 18, or by removing the first plug 13 from the communication jack in the PoE device. In either instance, when a PoE device is disconnected from the network as it is receiving power, it is common that a spark or arc will occur between one or more of the jackwires within the RJ45 jack and one or more of the blades of the RJ45 plug.

The spark or arc can damage the jackwires and/or the blades of the plug. For example, the electrical material forming the jackwires and blades can be pitted and discolored. Further, the plastic supporting the jackwires and the blades can be melted and deformed. Either condition can lead to improper mating of the RJ45 plug into the RJ45 jack, and/or poor connection quality for the communication signals.

One prior attempt to address the issue focused on improving the jackwires within the RJ45 jack. An example of an enhanced RJ45 jack with jackwires to suppress sparks and arcs can be found in U.S. Pat. No. 7,467,960 and Published US Patent Application 2017/0256895, both of which are herein incorporated by reference.

FIG. 3 of U.S. Pat. No. 7,467,960 is reproduced in this application as prior art FIG. 4. In FIG. 4, it can be seen that the jackwire frame is formed of electrical contacts 33. Each of the electrical contacts 33 includes a contacting portion 35 slantwise extending into an opening in the plug aperture 22 (in FIG. 1). Soldering portions 37 would connect to the back-end wire connection assembly 24 (in FIG. 1). Connecting portions 39 connect the contacting portions 35 and the soldering portions 37. The contacting portion 35 further defines a conductive area 41 and a less conductive area 43, less conductive than the conductive area 41. The less conductive area 43 is formed by applying a layer 45 of low conductive material, such as polymer, ceramic, etc, on a conductive base 47.

Each layer 45 of low conductive material is positioned on the jackwire at a position which is the last position to make electrical contact with the corresponding blade of the second plug 14, as the second plug 14 is being uncoupled from the jack 20. In this manner, any spark that may result from breaking a PoE current passing thorough the blade-to-jackwire connection will be absorbed by the layer 45 of low conductive material. The layer 45 of low conductive material is more robust and does not damage easily in the presence of such sparks. However, the layer 45 of low conductive material is not well suited to the transmission of high speed communication signals and it therefore is only used in the area where the plug blades last make contact with the jackwires.

FIG. 4A shows a typical RG plug, like plugs 13 and 14 (in FIG. 1), in accordance with the prior art found in the Assignee's prior U.S. Pat. Nos. 7,425,159 and 7,972,183, which are herein incorporated by reference. The overall structures and functions of the elements depicted by reference numerals 211-224, 226-229 and 233 can be best understood with a reference to the elements referred to by reference numerals 11-24, 26-29 and 33, respectively, in U.S. Pat. Nos. 7,425,159 and 7,972,183. Only those features relevant to the present invention will be discussed below.

SUMMARY OF THE INVENTION

The Applicant has appreciated that jackwires of the typical communication jack 20 disconnect from the blades of the typical plug at substantially the same time, but never at exactly the same time. Of course, with precise measurement, no two events can occur exactly simultaneously. After building a device to determine the order in which the blades of the plug disconnect from the jackwires of the jack, the Applicant discovered that the disconnection pattern between the blades of the plug and the jackwires of the jack is actually random.

For example, out of seven operations to remove the plug from the jack, as monitored by the testing device built by the Applicant, the first blade and first jackwire were the first to break contact out of the eight blade and jackwire combinations on two occasions. The first blade and first jackwire were the second to break contact on one occasion. The first blade and first jackwire were the fourth to break contact on two occasions. The first blade and first jackwire were the fifth to break contact on one occasion. The first blade and first jackwire were the seventh to break contact on one occasion. The first blade and first jackwire were never the third, sixth or eight to break contact during the seven event trial run. A chart showing the randomness of the experimental results obtained by the Applicant is shown in FIG. 5.

Because the order in which the blades and jackwires break contact is random, each of the jackwires in the prior art of FIG. 4 must be made robust in the less conductive area 43 using the additional layer 45. The Applicant has discover a way to make a jack which will perform to suppress damage from sparks and arcs during a decoupling of the plug from the jack, while sparing the cost of coating a portion of each of the jackwires with the layer 45. In other words, by controlling at least part of the order in which the jackwires disconnect from the blades of the plug, several of the jackwires do not need to have the additional layer 45.

An upgraded RJ45 jack is the best solution for new, future products to reduce damage from PoE sparks. An upgraded RJ45 jack can also offer some limited benefits as a retrofit solution for existing networks. Replacing the RJ45 communication jack 20 within a wall plate 18 (of FIG. 1) is not entirely difficult. However, it does take time for a trained technician to cut the communication jack 20 free from the twisted pair cabling 26 within the wall, and install an improved communication jack with enhanced jack wires. Upgrading the communication jack within a device, e.g. the portable hard drive 10, is much more difficult. The housing or casing of the device must be opened, and often times the communication jack is soldered onto a printed circuit board within the device. Hence, replacing the communication jack of a device is extremely time consuming and runs the risk of damaging the device.

Where the PoE devices 10 have the prior are style jacks, the Applicant has appreciated that the first and second RJ45 plugs 13 and 14 on the patch cord 11 may be enhanced to address the issues of sparks and arcs when disconnecting (or connecting) the PoE device 10 to a network device 30. By providing employees with approved cordage for network connected devices, no technician time is needed to replace the first and second jacks within the wall outlets and the devices.

These and other objectives are accomplished by an RJ jack comprising a jack housing; an opening formed in the jack housing adapted to accept an RJ plug; a latch catch formed on a first side within said opening of said jack housing to retain a latch of the RJ plug; and a plurality of contact terminals formed on a second side within said opening of said jack housing, each contact terminal formed to make electrical contact with a corresponding conductive blade of the RJ plug, wherein said plurality of contact terminals includes at least two primary contact terminals which have first engagement portions positioned at least a first distance from a plane of said opening, wherein said first engagement portions of said at least two primary contact terminals are the last portions of said at least two primary contact terminals to make electrical contact with corresponding blades of the RJ plug upon removal of the RJ plug from said opening of said jack housing, and wherein said plurality of contact terminals includes at least two secondary contact terminals having second engagement portions which are positioned less than said first distance from the plane of said opening, wherein said second engagement portions of said at least two secondary contact terminals are the last portions of said at least two secondary contact terminals to make electrical contact with corresponding blades of the RJ plug upon removal of the RJ plug from said opening of said jack housing, wherein said second engagement portions of said at least two secondary contact terminals break electrical contact with their corresponding blades of the RJ plug after electrical contact has been broken between said first engagement portions of said at least two primary contact terminals and their corresponding blades of the RJ plug, and wherein a first of said first engagement portions is formed of a first material different from a second material used to form a first of said second engagement portions.

Further, these and other objectives are accomplished by an RJ jack comprising: a jack housing; an opening formed in the jack housing adapted to accept an RJ plug; a latch catch formed on a first side within said opening of said jack housing to retain a latch of the RJ plug; and a plurality of contact terminals formed on a second side within said opening of said jack housing, each contact terminal formed to make electrical contact with a corresponding conductive blade of the RJ plug, wherein said plurality of contact terminals includes at least two primary contact terminals which have first engagement portions positioned at least a first distance from a plane of said opening, wherein said first engagement portions of said at least two primary contact terminals are the last portions of said at least two primary contact terminals to make electrical contact with corresponding blades of the RJ plug upon removal of the RJ plug from said opening, wherein said plurality of contact terminals includes a secondary contact terminal having a second engagement portion which is positioned at a second distance, less than said first distance, from said plane of said opening, wherein said second engagement portion of said secondary contact terminal is the last portion of said secondary contact terminal to make electrical contact with a corresponding blade of the RJ plug upon removal of the RJ plug from said opening, and wherein said plurality of contact terminals includes a tertiary contact terminal having a third engagement portion which is positioned at a third distance, less than said second distance, from said plane of said opening, wherein said third engagement portion of said tertiary contact terminal is the last portion of said tertiary contact terminal to make electrical contact with a corresponding blade of the RJ plug upon removal of the RJ plug from said opening.

Moreover, these and other objectives are accomplished by an RJ jack comprising: a jack housing; an opening formed in the jack housing adapted to accept an RJ plug; a latch catch formed on a first side within said opening of said jack housing to retain a latch of the RJ plug; and eight contact terminals formed on a second side within said opening of said jack housing, each contact terminal formed to make electrical contact with a corresponding conductive blade of the RJ plug, wherein said plurality of contact terminals includes exactly two displaced contact terminals placed within the opening of said jack to always be the last two contact terminals of said eight contact terminals to make electric contact with the conductive blades of the RJ plug when the RJ plug is being withdrawn from the opening of said RJ jack.

An improved RJ plug, in accordance with a first aspect of the invention, includes a plug housing; a front nose formed on said plug housing, adapted to be inserted into a jack; a latch on a first side of said plug housing, said latch being resiliently deflectable and adapted to engage with a structure within the jack to hold said plug housing within the jack; a plurality of channels formed in a second side of said plug housing, opposite to said first side; and a plurality of blades held within said plurality of channels, with one blade in each channel, wherein each blade is formed of a conductive material and includes a first portion to conduct electrical signals and/or power between said blade and a wire within a cable attached to said plug housing, each blade further including a second portion to conduct signals and/or power between said blade and a contact within the jack and a third portion to conduct signals and/or power between said blade and the contact within the jack, characterized by a first electrical resistance value through said blade between said second portion and said first portion being greater than a second electrical resistance value through said blade between said second portion and said first portion by at least 5%.

Further, the improved RJ plug, in accordance with a second aspect of the invention, may include a plug housing; a front nose formed on said plug housing, adapted to be inserted into a jack; a latch on a first side of said plug housing, said latch being resiliently deflectable and adapted to engage with a structure within the jack to hold said plug housing within the jack; a plurality of channels formed in a second side of said plug housing, opposite to said first side; and a plurality of blades held within said plurality of channels, with one blade in each channel, wherein each blade is formed of a conductive material and includes a first portion to conduct electrical signals and/or power between said blade and a wire within a cable attached to said plug housing, each blade further including a second portion to conduct signals and/or power between said blade and a contact within the jack and a third portion to conduct signals and/or power between said blade and the contact within the jack, characterized by said second portion of said blade being formed of a first conductive material and said third portion of said blade being formed of a second conductive material, different from said first conductive material.

Cordage, in accordance with invention, may include a segment of cable with plural twisted pairs therein terminated to a first RJ plug at a first end and a second RJ plug at a second end, wherein the first and second RJ plugs have the improved blade structures as detailed in the first and/or second aspects.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
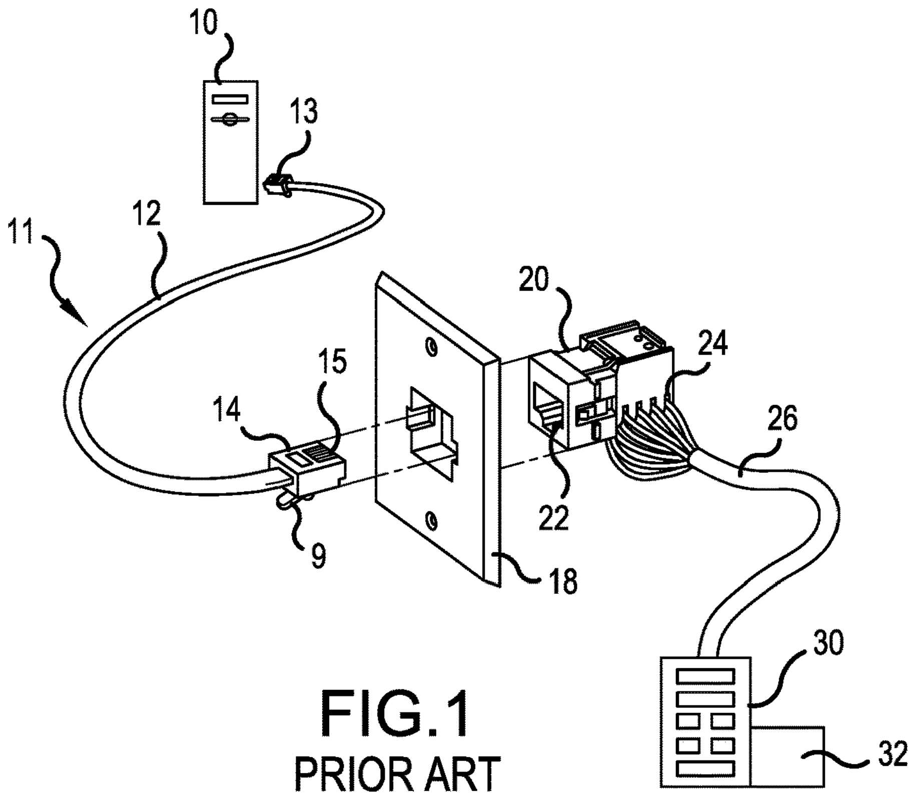
FIG.1 PRIOR ART
FIG. 1 is a schematic illustrating a portable hard drive connected to a network with Power over Ethernet (PoE), via RJ45 jacks and a patch cord with RJ45 plugs, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “lateral”, “left”, “right” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as “under” or “beneath” other elements or features would then be oriented “over” the other elements or features. The device may be otherwise oriented (rotated 90 degrees or at other orientations) and the descriptors of relative spatial relationships used herein interpreted accordingly.

Figure 6:
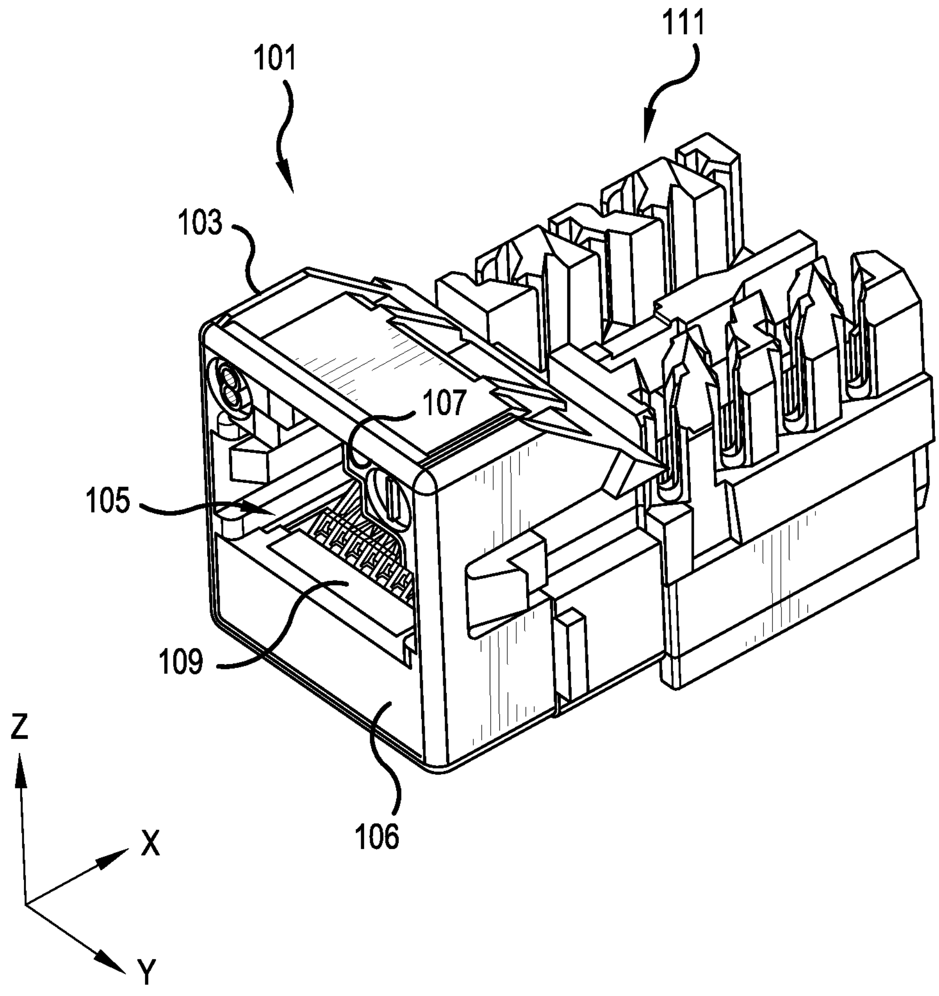
FIG. 6 is a front perspective view of a jack, in accordance with the present invention.

FIG. 6 is a front perspective view of a jack 101 in accordance with the present invention. The jack 101 includes a housing 103 with an opening 105 formed in the housing 103 and adapted to accept the RJ-style, communications plug 14 (FIG. 1). The RJ-style, communications plug 14 may be formed the same as the RJ plugs described in the Assignee’s prior U.S. Pat. Nos. 7,425,159 and 7,972,183, which are herein incorporated by reference.

The opening 105 exists in a plane 106 defined in the Y-Z directions, whereas the opening 105 extends into the housing 103 in the Z direction. A rear of the housing may include insulation displacement connectors (IDCs) 111 to connect the jack 101 to cable 26 (FIG. 1).

Figure 2:
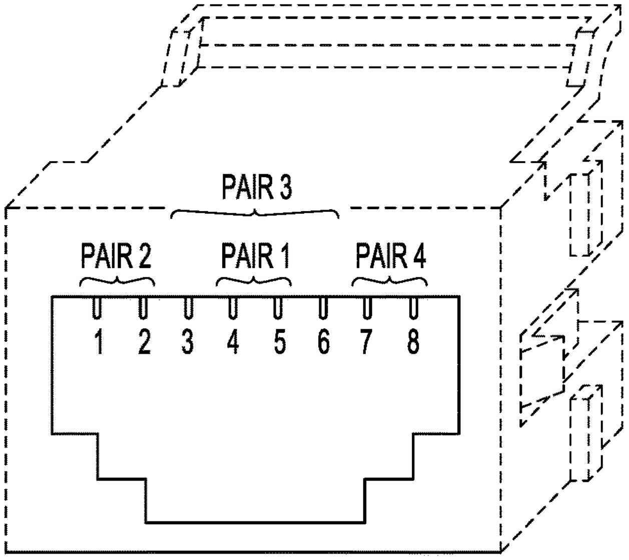
FIG.2 PRIOR ART
FIG. 2 is perspective front view of an opening in an RJ45 wall jack, with the contact terminals numbered, in accordance with the prior art.

A latch catch 107 is formed on a first side within the opening 105 of the housing 103 to retain the latch 9 of the plug 14. A plurality of contact terminals (corresponding to terminals 1-8 in FIG. 2) are formed on a second side, opposite the first side, within the opening 105 of the jack housing 103. Each contact terminal is formed to make electrical contact with a corresponding conductive blade of the plug 14, and may be separated from adjacent contact terminals by a dielectric comb-like structure 109 on the second side within the opening 105. In the embodiment of FIG. 6, the jack 101 is formed as an RJ45 jack, however the jack 101 may take other RJ formats, such as an RJ11 or RJ50 format.

Figure 7:
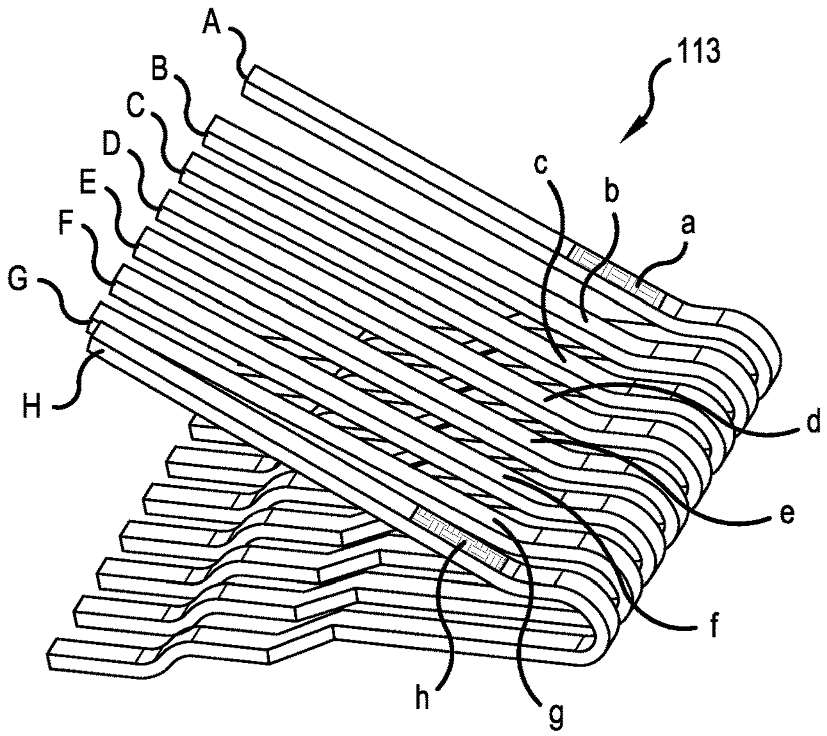
FIG. 7 is a front perspective view of a jackwire frame for reducing damage due to sparks and arcs when disconnecting a PoE device from a jack, in accordance with a first embodiment of the present invention.

FIG. 7 is a front perspective view of a jackwire frame 113 for reducing damage due to sparks and arcs when disconnecting a PoE device 10 from the jack 101, in accordance with a first embodiment of the present invention. In the embodiment of FIG. 7, the plurality of contact terminals 1-8 take the form of first through eighth jackwires A, B, C, D, E, F, G and H, which are formed of a resilient, conductive metal, such as resilient jackwires, sometimes called spring wires. The plurality of contact terminals A-H may be used to both receive or transmit communication signals as well as for transmitting power to the device 10.

For the purposes of explaining the operations of the present invention, at least two of the contact terminals are designated as primary contact terminals B, C, D, E, F and G which have first engagement portions b, c, d, e, f and g positioned at least a first distance from the plane 106 of the opening 105. The first engagement portions b, c, d, e, f and g of the at least two primary contact terminals B, C, D, E, F and G are the last portions of the at least two primary contact terminals B, C, D, E, F and G to make electrical contact with corresponding blades of the plug 14 upon removal of the plug 14 from the opening 105 of the housing 103.

The plurality of contact terminals A-H also includes at least two secondary contact terminals A and H having second engagement portions a and h, which are positioned a second distance, less than the first distance, from the plane 106 of the opening 105. The second engagement portions a and h of the at least two secondary contact terminals A and H are the last portions of the at least two secondary contact terminals A and H to make electrical contact with corresponding blades of the plug 14 upon removal of the plug 14 from the opening 105 of the housing 103.

As best seen in FIG. 7, the secondary contact terminals A and H are bent upwardly relative the primary contact terminals B, C, D, E, F and G, making the secondary contact terminals A and H closer to the plane 106 of the opening 105. As such, the second engagement portions a and h of the secondary contact terminals A and H break electrical contact with their corresponding blades of the plug 14 after electrical contact has been broken between the first engagement portions b, c, d, e, f and g of the primary contact terminals B, C, D, E, F and G and their corresponding blades of the plug 14.

At least a one of the first engagement portions b, c, d, e, f and g is formed of a first material different from a second material used to form at least one the second engagement portions a and h. In the embodiment of FIG. 7, all six of the first engagement portions b, c, d, e, f and g are formed of the first material, and both of the second engagement portions a and h are formed of the second material. The second material is selected to be better in its ability to resist damage from sparks or arcs as compared to the first material.

To better understand the nature of the improvement of the present invention, consider if the device 10, e.g., the portable hard drive 10, is pulling power from the PoE network, as the plug 14 is being withdrawn from the jack 101. When such occurs, one or more sparks or arcs will occur between the blades of the plug 14 and the jackwires A-H of the jackwire frame 113. As discussed in the background section and depicted in FIG. 5, the order of disconnection is fairly random with the jackwire frames of the prior art, shown in FIGS. 1, 2 and 4. Therefore, in accordance with the prior art of FIG. 4, all of the jackwires are reinforced with a layer 226 to deal with sparks and arcs.

Figure 4:
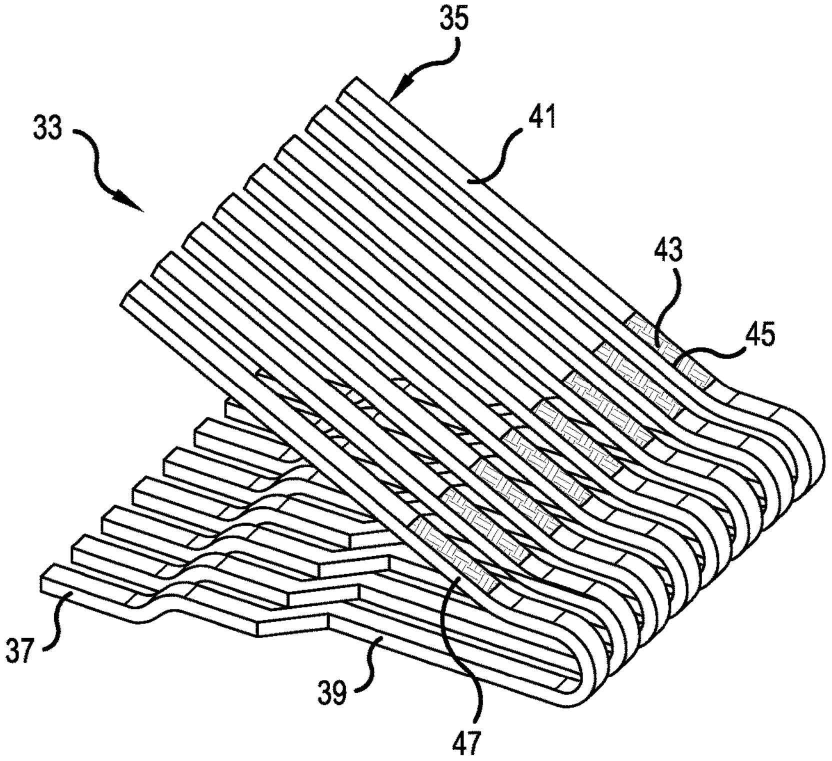
FIG.4 PRIOR ART
FIG. 4 is a front perspective view of a jackwire frame for reducing damage due to sparks and arcs when disconnecting a PoE device from an RJ45 wall jack, in accordance with the prior art.
Figure 4A:
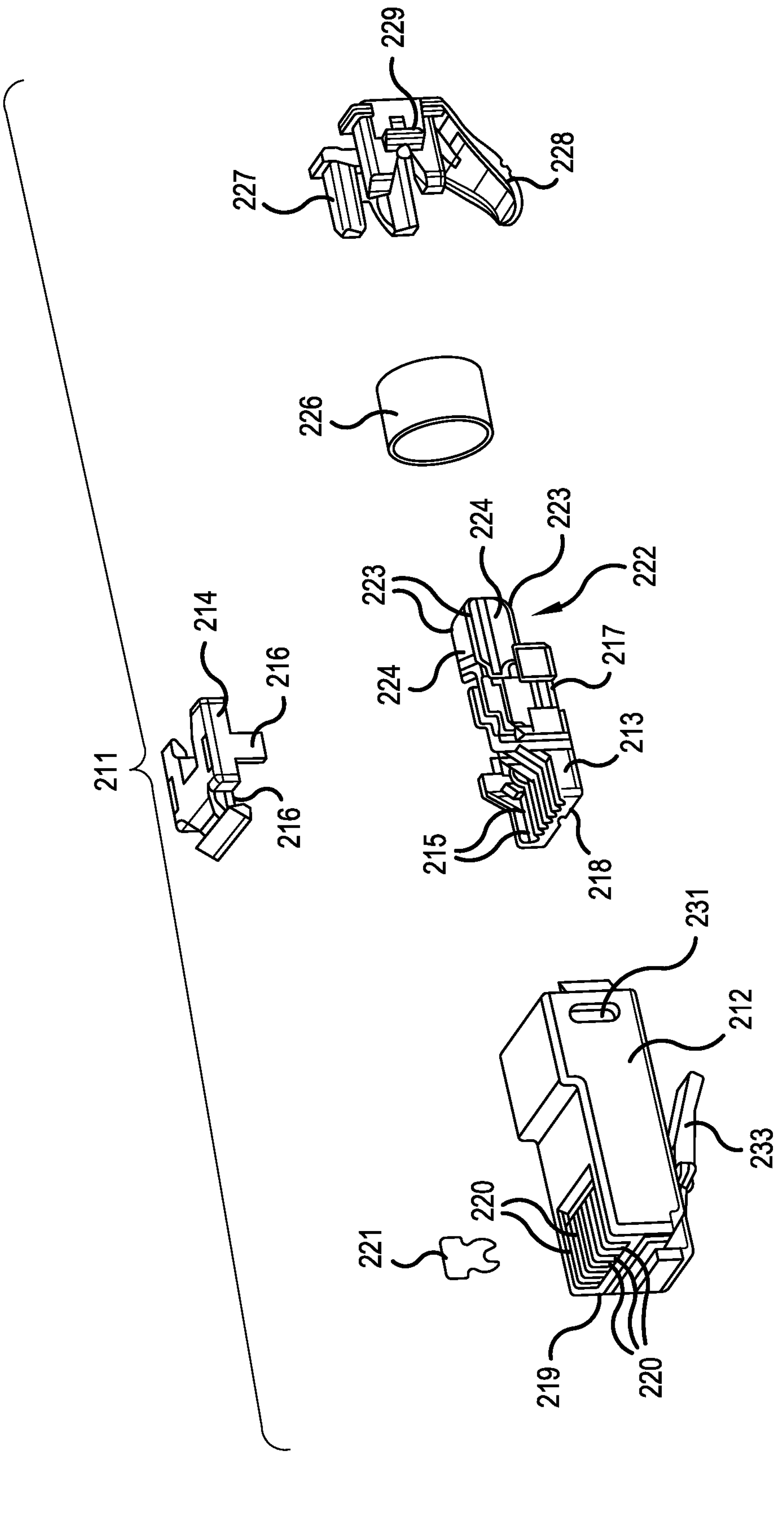
FIG.4A PRIOR ART
FIG. 4A is an exploded view of a typical RJ45 plug, in accordance with the prior art.
Figure 5:
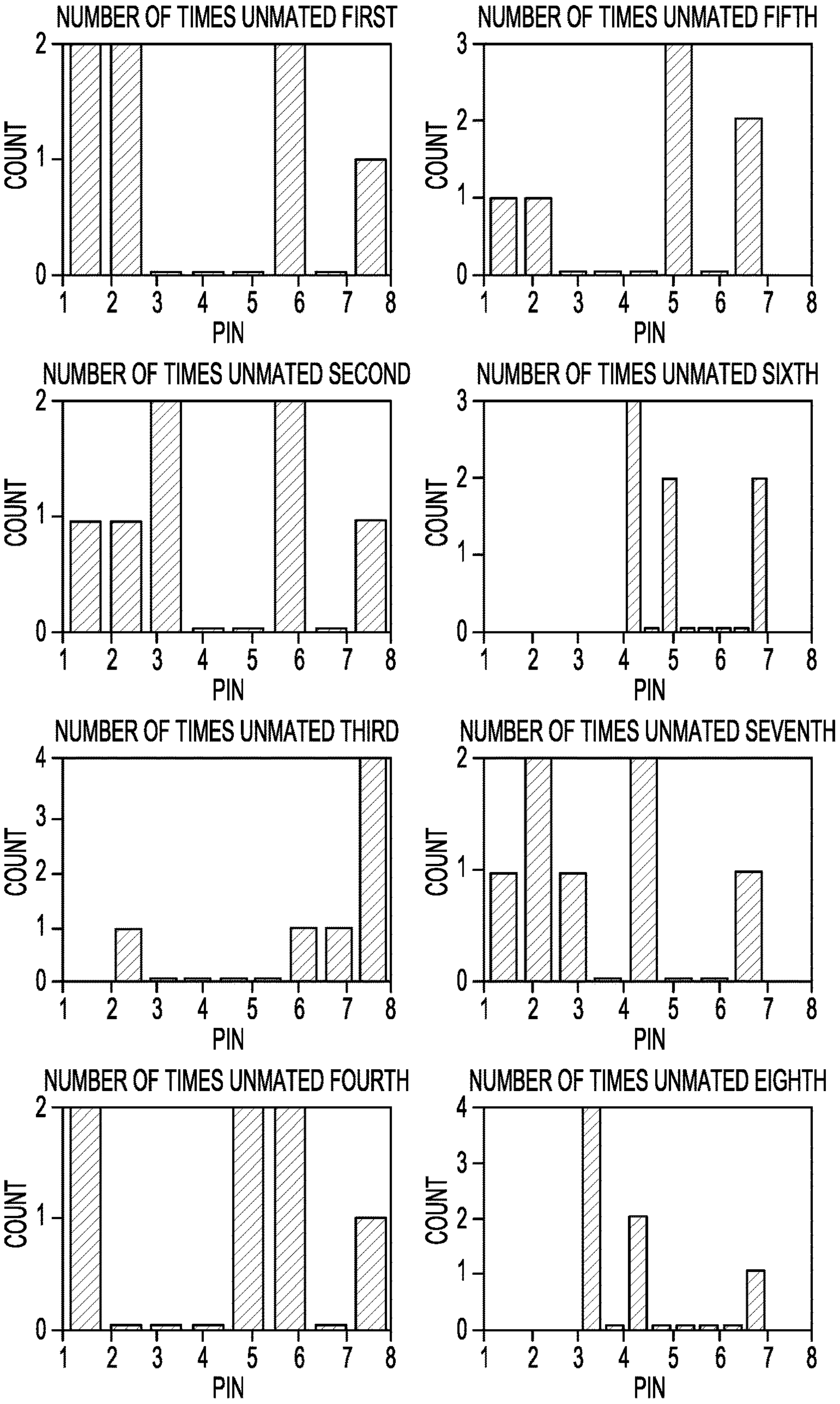
FIG. 5 is a data chart showing the randomness of jackwire disconnection ordering when removing an RJ45 plug from an RJ45 jack, as measured by a device created by the Applicant.

As explained below, some embodiments of the present invention can provide an equal level of protection, as compared to the jackwire frame of FIG. 4, while only reinforcing half of the jackwires, e.g., a 50% cost saving for the reinforcement materials. The reinforcement materials may in some embodiments be an increased layer of actual gold, so the cost savings in producing millions of jackwire frames is very significant, considering that gold is currently selling in excess of $1,400 per ounce. In other embodiments, as few as three, two or one jackwire can be reinforced and many of the benefits of the invention are still applicable.

Assuming that the device 10 is pulling 1.0 amp at 52 volts, each insulated wire is either supplying or grounding a flow of about 0.25 amps. In other words, four of the eight insulated wires in the cable 26 are connected to the positive terminal of the DC power source 32 and are carrying about 0.25 amps each to the device 10. Likewise, four of the eight insulated wires in the cable 26 are connected to the negative terminal or ground of the DC power source 32 and are therefore carrying about 0.25 amps each form the device 10 to the negative terminal or ground. The first spark will occur when the first break occurs between any of the mated sets of a blade and a jackwire. The first spark is generated by the disconnection of 52 volt at a current of 0.25 amps, and will be relatively small and do little, or perhaps no damage, even to unreinforced jackwires, e.g., jackwires without a coating.

If the first disconnection is on the positive terminal side (wires connected to connector terminals 1, 2, 4 and 5 in Table 1), the remaining three positive wires are now carrying about 0.33 amps each to the device 10 (if following the 1.0 amp draw example above). The negative wires are continuing to carry about 0.25 amps from the device 10 to the ground terminal at the DC power source 32.

If the next disconnection also occurs between a mated set of a blade and a jackwire on the positive terminal side (the wires connected to connector terminals 1, 2, 4 and 5 in Table 1), the remaining two positive wires are now carrying about 0.5 amps each to the device 10. If the next disconnection also occurs between a mated set of a blade and a jackwire on the positive terminal side (wires connected to connector terminals 1, 2, 4 and 5 in Table 1), the sole remaining positive wire is now carrying the full 1.0 amps to the device 10. The final disconnection between a corresponding blade and jackwire on the positive side will result in the largest and most damaging spark based upon the amperage of 1.0 amp.

Of course, the sequence of increasing the magnitude of the sparks with each disconnection is similar for the connector terminals 3, 6, 7 and 8, which are connected to the insulated wires within the cable 26 associated with the ground terminal of the DC power source 32. The first spark will be caused by a 0.25 amp flow, the second spark by a 0.33 amp flow, the third spark by a 0.5 amp flow and the fourth spark will be generated by a 1.0 amp flow. However, it should be noted that only a single 1.0 amp spark will be generated as a plug 14 is unmated from the jack 20. The final 1.0 amp spark will come from the last disconnected positive terminal 1, 2, 4 or 5, if at least one negative terminal 3, 6, 7 and 8 has yet to disconnect from its corresponding blade of the plug 14. The final 1.0 amp spark will come from the last disconnected negative terminal 3, 6, 7 and 8, if at least one positive terminal 1, 2, 4 or 5 has yet to disconnect from its corresponding blade of the plug 14.

As many as seven sparks between the blades of the plug 14 and the jackwires A-H can occur upon disconnection of the plug 14 from the jack 20, as there will never be a current flow passing through the last disconnection between a blade of the plug 14 and one of jackwires A-H. Only six sparks would occur if the last two remaining connections between the blades of the plug 14 and the jackwires A-H upon disconnection are both associated with the positive terminals 1, 2, 4 and 5. Only six sparks would occur if the last two remaining connections between the blades of the plug 14 and the jackwires A-H upon disconnection are both associated with the negative terminals 2, 6, 7 and 8.

Only five sparks would occur if the last three remaining connections between the blades of the plug 14 and the jackwires A-H upon disconnection are all three associated with the positive terminals 1, 2, 4 and 5. Likewise, only five sparks would occur if the last three remaining connections between the blades of the plug 14 and the jackwires A-H upon disconnection are all three associated with the negative terminals 2, 6, 7 and 8.

Only four sparks would occur if the last four remaining connections between the blades of the plug 14 and the jackwires A-H upon disconnection are all four associated with the positive terminals 1, 2, 4 and 5. Likewise, only four sparks would occur if the last four remaining connections between the blades of the plug 14 and the jackwires A-H upon disconnection are all four associated with the negative terminals 2, 6, 7 and 8.

The Applicant has discovered that the damage to the jackwires A-H due to sparks and arcs is the most sever with the final spark because it is the spark with the highest amperage. Damage can also occur due to repetitive sparks of lower amperage, such as the one or possibly two 0.5 amp sparks which may occur during removal of the plug 14 from the jack 20. Although the example above has referenced a device 10 pulling 1.0 amps, the device 10 may pull less or more power from the DC power source 32. In the case of IEEE 802.3bt, the device 10 may pull up to 1.73 amps at 52 volts.

The Applicant has discovered that controlling the distance of the first and second engagement surfaces a-h relative to the opening 105 of the housing 103 of the jack 101, controls which one of the jackwires A-H receives the most sever spark. One can also control the number of sparks, reducing the number down from as many as seven sparks to a predictable four sparks. By controlling the number of sparks and knowing in advance the jackwires that will receive the most sever sparks, it is possible to strengthen only a small subset of jackwires to resist damage from spark and arcs instead of strengthening all of the jackwires as shown in the prior art of FIG. 4.

One of the principals of the present invention is to have “stages” in jackwire disconnection. The first embodiment depicted in FIG. 7 is a two stage disconnection system. The first engagement portions b, c, d, e, f and g of the primary contact terminals B, C, D, E, F and G are spaced at about the same first distance from the plane 106 of the opening 105 and will disengage randomly at about the same time, during a first stage. The first stage disengagements will randomly produce between three to six sparks. The sparks will step up from a 0.25 amp spark to a maximum of a 0.5 amp spark (based upon the previous example of a 1.0 amp current draw).

The second engagement portions a and h of the secondary contacts A and H are spaced at about the same second distance from the plane 106 of the opening 105 and will disengage randomly at about the same time, during a second stage. The final large spark will occur during the second stage. The final large spark, e.g., the 1.0 amp spark in the above example, will randomly occur at the first of the second engagement portions a or h to break contact with the corresponding blade of the plug 14. Hence, if only the final spark is of concern for damaging the jackwires A-H, then only two of the jackwires A and H need to be hardened with additional protection in the two stage embodiment of FIG. 7.

Figure 8:
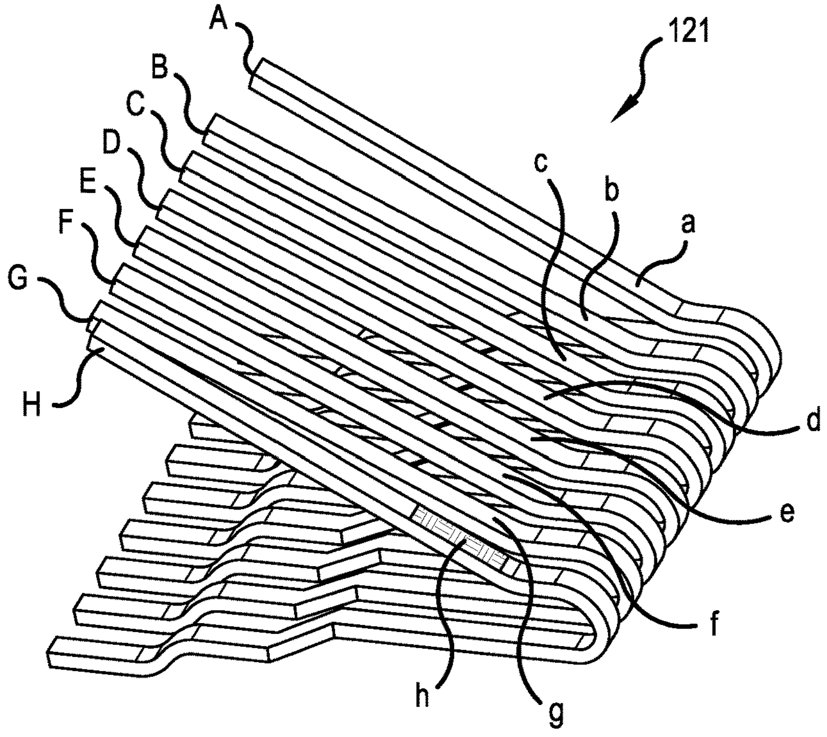
FIG. 8 is a front perspective view of a jackwire frame for reducing damage due to sparks and arcs when disconnecting a PoE device from a jack, in accordance with a second embodiment of the present invention.

FIG. 8 is a front perspective view of a jackwire frame 121 for reducing damage due to sparks and arcs when disconnecting a PoE device 10 from the jack 101, in accordance with a second embodiment of the present invention. FIG. 8 shows a three stage system. The primary contact terminals B, C, D, E, F and G have the same first bend angle and are spaced at about the same first distance from the plane 106 of the opening 105 and will disengage randomly at about the same time, during the first stage.

The secondary contact terminal H has a second bend angle greater than the first bend angle, which causes the second engagement portion h to be positioned at the second distance, less than the first distance, from the plane 106 of the opening 105. The second engagement portion h is the last portion of the secondary contact terminal H to make electrical contact with a corresponding blade of the plug 14 upon removal of the plug 14 from the opening 105 of the jack 101.

The plurality of contact terminals A-H also includes a tertiary contact terminal A. The tertiary contact terminal A has a third bend angle greater than the second bend angle, which causes the third engagement portion a to be positioned at a third distance, less than the second distance, from the plane 106 of the opening 105. The third engagement portion a is the last portion of the tertiary contact terminal A to make electrical contact with a corresponding blade of the plug 14 upon removal of the plug 14 from the opening 105 of the jack 101.

The third engagement portion a of the tertiary contact terminal A breaks electrical contact with its corresponding blade of the plug 14 after electrical contact has been broken between the second engagement portion h of the secondary contact terminal H and its corresponding blade of the plug 14. Also, the second engagement portion h of the secondary contact terminal H breaks electrical contact with its corresponding blade of the plug 14 after electrical contact has been broken between the first engagement portions b, c, d, e, f, and g of the primary contact terminals B, C, D, E, F and G with the corresponding blades of the plug 14.

In the embodiment of FIG. 8, the final large spark will occur at the second stage. The final large spark, e.g., the 1.0 amp spark in the above example, will predictably occur at the second engagement portion h as it breaks contact with the corresponding blade of the plug 14. The final break in connection between the blades of the plug 14 and the jackwires A-H will occur at the third engagement portion a of the tertiary contact terminal A during the third stage and will not cause a spark because there is no longer a current flow to the device 10. Hence, if only the final spark is of concern for damaging the jackwires A-H, then only H needs to be hardened with additional protection in the three stage embodiment of FIG. 8.

Of course in the three stage embodiment of FIG. 8, the bend patterns could be altered (1) to select any of the negative jackwires C, F, G and H (associated with contact terminals 3, 6, 7 and 8) to be the next-to-last jackwire to disconnect from the blades of the plug 14, and (2) to select any of the positive jackwires A, B, D and E (associated with contact terminals 1, 2, 4 and 5) to be the last jackwire to disconnect from the blades of the plug 14. Alternatively, any of the positive jackwire A, B, D and E (associated with contact terminals 1, 2, 4 and 5) could be the solely hardened jackwire and bent to be the next-to-last jackwire to disconnect from the blades of the plug 14, while any of the negative jackwires C, F, G and H (associated with contact terminals 3, 6, 7 and 8) could be bent to be the last jackwire to disconnect from the blades of the plug 14.

Figure 9:
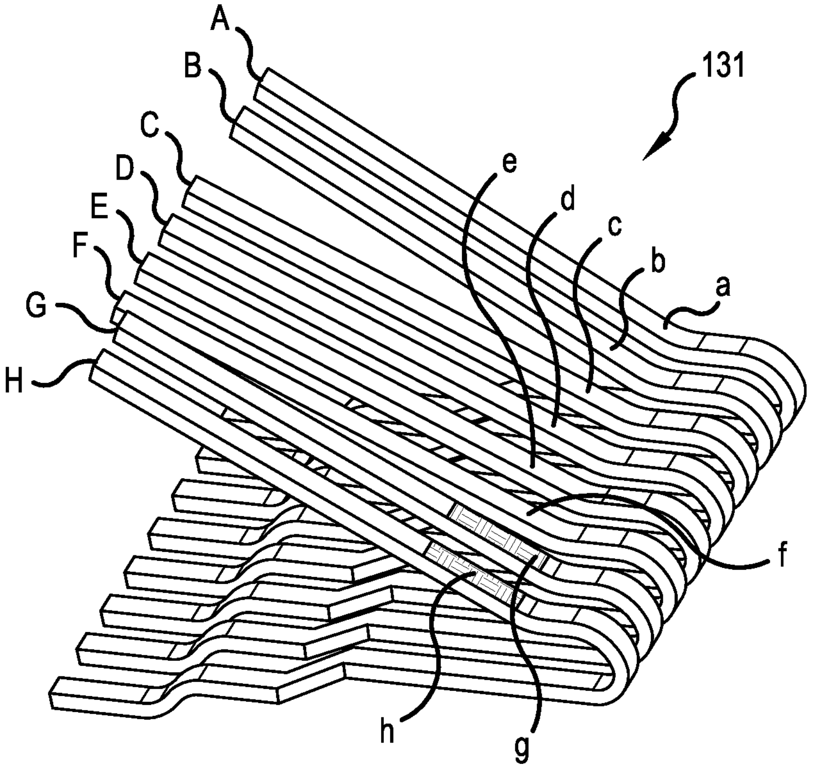
FIG. 9 is a front perspective view of a jackwire frame for reducing damage due to sparks and arcs when disconnecting a PoE device from a jack, in accordance with a third embodiment of the present invention.

FIG. 9 is a front perspective view of a jackwire frame 131 for reducing damage due to sparks and arcs when disconnecting a PoE device 10 from the jack 101, in accordance with a third embodiment of the present invention. FIG. 9 also shows a three stage system with a different configuration, compared to FIG. 8. The primary contact terminals C, D, E and F have the same first bend angle and are spaced at about the same first distance from the plane 106 of the opening 105 and will disengage randomly at about the same time, during the first stage.

The secondary contact terminals G and H have a second bend angle greater than the first bend angle, which causes the second engagement portions g and h to be positioned at the second distance, less than said first distance, from the plane 106 of the opening 105. The second engagement portions g and h are the last portions of the secondary contact terminals G and H to make electrical contact with corresponding blades of the plug 14 upon removal of the plug 14 from the opening 105 of the jack 101.

The plurality of contact terminals A-H also includes tertiary contact terminals A and B. The tertiary contact terminals A and B have a third bend angle greater than the second bend angle, which causes the third engagement portions a and b to be positioned at a third distance, less than the second distance, from the plane 106 of the opening 105. The third engagement portions a and b are the last portions of the tertiary contact terminals A and B to make electrical contact with corresponding blades of the plug 14 upon removal of the plug 14 from the opening 105 of the jack 101.

In the embodiment of FIG. 9, the final two sparks will occur at the second stage. The two sparks, e.g., the 0.5 amp spark and the 1.0 amp spark in the above example, will predictably occur at the second engagement portions h and g as they break contact with the corresponding blades of the plug 14. The last two breaks in connection between the blades of the plug 14 and the jackwires A-H will occur at third engagement portion a and b of the tertiary contact terminals A and B during the third stage and will not cause sparks because there is no longer a current flow to the device 10.

Hence, if only the last two sparks are of concern for damaging the jackwires A-H, then only jackwires G and H need to be hardened with additional protection in the three stage embodiment of FIG. 9. The system of FIG. 9 also insures that there are no more than six sparks upon disconnection, and that all of the sparks occurring at the primary connection terminals C, D, E and F (which are not hardened) are on the order of 0.25 amps or 0.33 amps in the 1.0 amp draw example above.

Of course, the bend patterns could be altered. It would be possible to select any group of two or three of the positive jackwires A, B, D and E to be placed in the third stage, e.g., at the third bend angle. Likewise, it would be possible to select any group of two or three of the negative jackwires C, F, G and H to be hardened and placed in the second stage, e.g., at the second bend angle. Alternatively, it would be possible to select any group of two or three of the negative jackwires C, F, G and H to be placed in the third stage, e.g., at the third bend angle, and to select any group of two or three of the positive jackwires A, B, D and E to be hardened and placed in the second stage, e.g., at the second bend angle.

Figure 10:
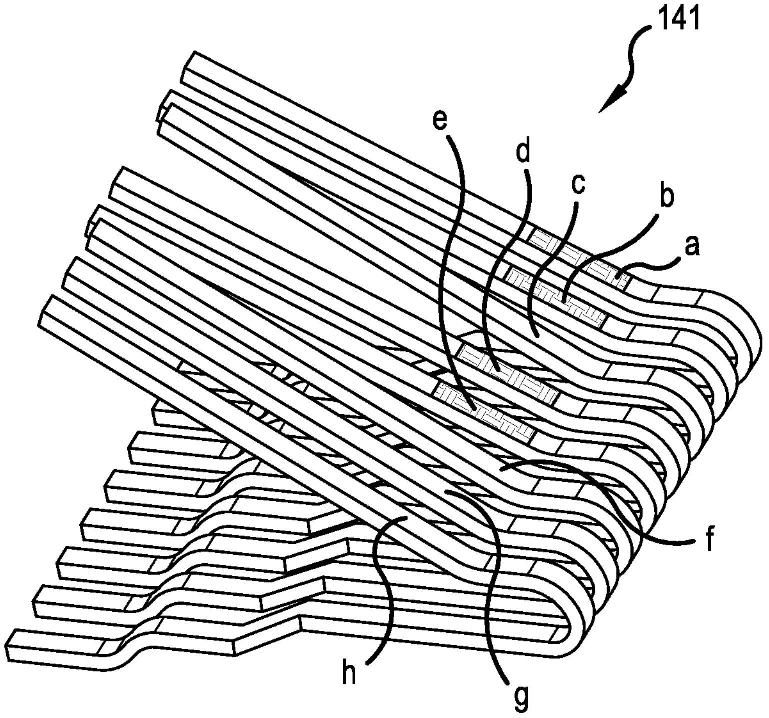
FIG. 10 is a front perspective view of a jackwire frame for reducing damage due to sparks and arcs when disconnecting a PoE device from a jack, in accordance with a fourth embodiment of the present invention.

FIG. 10 is a front perspective view of a jackwire frame 141 for reducing damage due to sparks and arcs when disconnecting a PoE device 10 from the jack 101, in accordance with a fourth embodiment of the present invention. FIG. 10 shows a two stage system with a different configuration, compared to FIG. 7.

The primary contact terminals A, B, D and E have the same first bend angle, which causes the first engagement portions a, b, d and e to be positioned at about the same first distance from the plane 106 of the opening 105, so that the first engagement portions a, b, d and e will disengage randomly at about the same time, during the first stage. The secondary contact terminals C, F, G and H have a second bend angle greater than the first bend angle, which causes the second engagement portions c, f, g and h to be positioned at the second distance, less than said first distance, from the plane 106 of the opening 105. The second engagement portions c, f, g and h are the last portions of the secondary contact terminals C, F, G and H to make electrical contact with corresponding blades of the plug 14 upon removal of the plug 14 from the opening 105 of the jack 101.

Upon disconnection of the plug 14 from the opening 105 of the jack 101, only four sparks will occur. The four sparks will impact only jackwires A, B, D and E, and hence only the first portions a, b, d and e need to be hardened. No sparks will occur with the disconnection of jackwires C, F, G and H because current will no longer be flowing to the device 10. It can be seen that the embodiment of FIG. 10 offers the same level of protection as the prior art's jackwire frame in FIG. 4, but only requires hardening of four of the eight jackwires.

The hardening of the selected one or more jackwires A-H of the jackwire frames 113, 121, 131 and 141 can be done in other manners besides those described in U.S. Pat. No. 7,467,960. Many jackwire frames are formed of a base metal, like a nickel alloy, a phosphorous bronze alloy, or a beryllium-copper alloy. An expensive and highly conductive alloy or metal, like gold, is thinly plated over the base metal of the jackwire frame. The communication signals flow mostly on the outer plating layer, and the expensive outer plating layer, e.g., gold, acts as an excellent conductor for the communication signals. However, any sparks, from PoE disconnections, tend to blast the thin gold plating off of the base metal at the spark site. Once the base metal is exposed to the environment, the base-metal can start to corrode. The corrosion can also spread under the gold plating to affect a larger area of the damaged jackwire.

In the present invention, only the selected one or more first or second portions a, b, c, d, e, f, g and h can have a thicker layer of the more expensive metal plating, e.g., the gold plating. The thicker plating may be twice as thick as the plating over the remaining portions of the jackwire frame 113, 121, 131 or 141. More preferably, the plating thickness for the selected one or more first or second portions a, b, c, d, e, f, g and h is three times, or even greater than four times, the thickness of the plating over the remaining portions of the jackwire frame 113, 121, 131 or 141. The thickened layer of conductive metal plating, e.g., the gold plating, will be more resistant to damage from sparks or arcs as compared to the base metal with only a thin layer of the conductive metal plating.

The majority of the jackwire frame 113, 121, 131 or 141 may be considered to be formed of a first material, whereas the hardened portions, i.e., the selected one or more first or second portions a, b, c, d, e, f, g and h, formed with an thicker plating, may be considered to be formed of a second material. In other words, the second material is different from the first material, and the second material is selected to resist damage from sparks or arcs better than the first material. Based upon this definition, FIG. 7 shows an embodiment where all of the first engagement portions b, c, d, e, f, and g of the primary contact terminals B, C, D, E, F and G are formed of the first material and all of the second engagement portions a and h of the secondary contact terminals A and H are formed of the second material. FIG. 9 shows an embodiment wherein the first engagement portions c, d, e, and f and the third engagement portions a and b are formed of the first material and the second engagement portions g and h are formed of the second material.

In another embodiment, the first material may be formed of a base metal with a highly conductive metal plating, e.g., a gold plating. The second material may be formed of the same base metal with a different plating, e.g., a silver plating. Silver plating tends to tarnish, and when tarnished is not a great conductor for the communication signals. However, when the plug 14 is fully mated into the opening 105 of the jack 101, the blades of the jack 14 are in contact with portions of the jackwires A-H which are spaced from the first, second and third engagement portions a-h. The portions engaged by the blades of the fully mated plug 14 would be the base metal plated by the highly conductive metal, e.g., the gold plating. The selected one or more first or second portions a, b, c, d, e, f, g and h would be small patches, plated with silver. The silver plating is believed to be more resistant to the sparks and arcs as compared to the gold plating.

In another embodiment, the first material may be formed of a base metal with the highly conductive metal plating, like copper. The second material may be formed of the same base metal with the highly conductive metal plating, but also includes a semiconducting layer applied over the highly conductive metal plating. The semiconducting layer may include a semiconducting material, like graphite or carbon. For example, semiconducting particles of graphite and/or carbon may be doped or distributed throughout a conductive metal and the mixture attached or applied to the jackwires to form the second material at the first or second portions a, b, c, d, e, f, g and h. The second material could have a higher electrical resistance per unit volume as compared to an electrical resistance per same unit volume of the first material. For example, the second material may have a resistance value which is greater by at least 5% as compared to the first material, such as at least 10% greater, or at least 15% greater.

The jack wires A-H which are residing at the second or third bend angle, i.e., located in the second or third stages of disconnection, are subjected to a greater deflection when the plug 14 is mated into the opening 105 of the jack 101. In accordance, with the Assignee's prior U.S. Pat. No. 9,537,273, which is herein incorporated by reference, the jackwires A-H which are subject to a greater deflection may be formed of a beryllium-copper alloy, which will have an improved resiliency to spring back to the second or third bend angle when the plug 14 is removed from the opening 105 of the jack 101.

Figure 11:
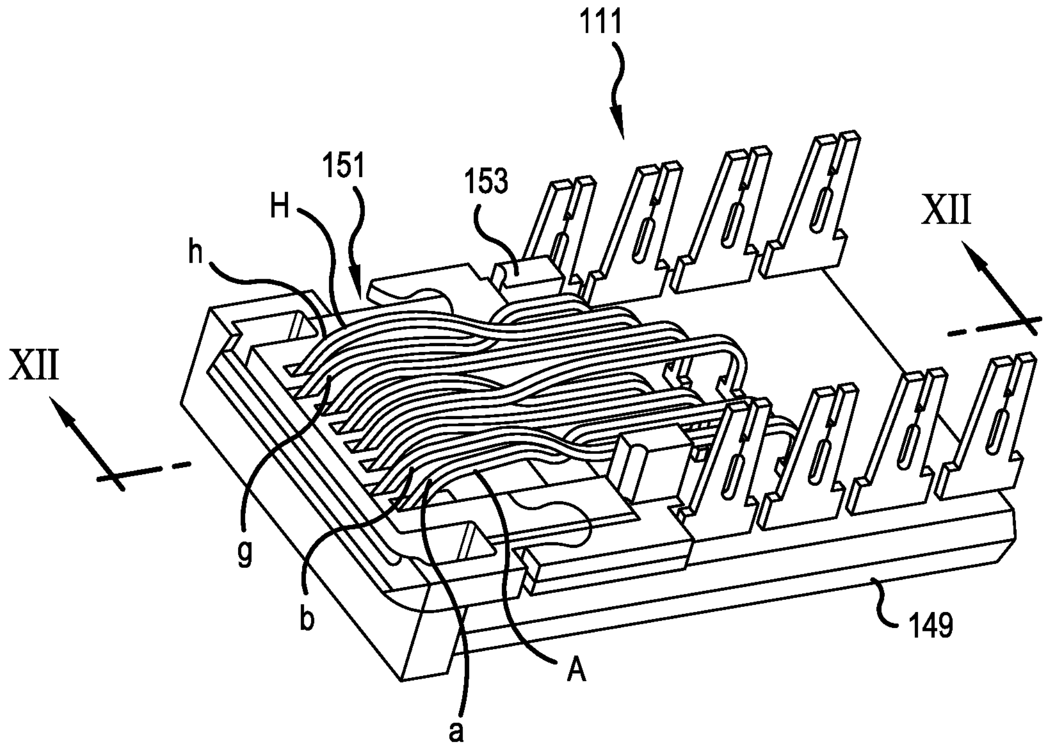
FIG. 11 is a front perspective view of a portion of a jack and a jackwire frame for reducing damage due to sparks and arcs when disconnecting a PoE device from a jack, in accordance with a fifth embodiment of the present invention.
Figure 12:
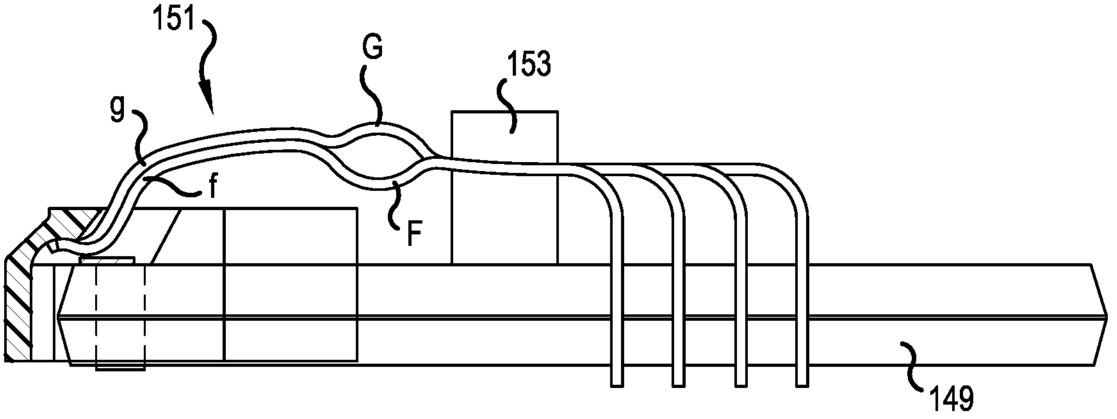
FIG. 12 is a cross sectional view taken along line XII-XII in FIG. 11 illustrating an offset nature of the jackwires.
Figure 13:
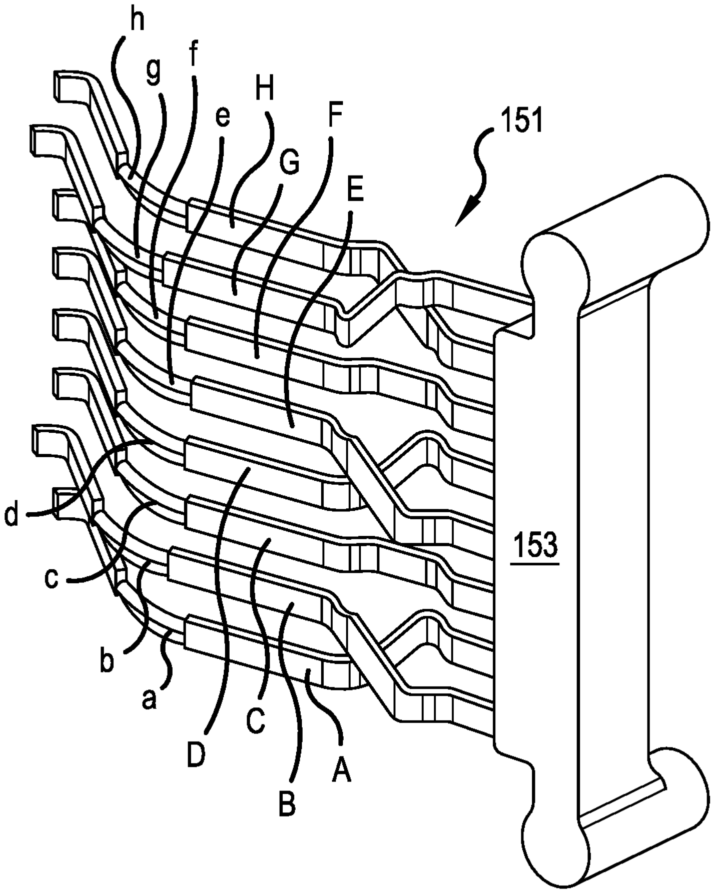
FIG. 13 a top perspective view of a front portion of the jackwire frame in FIGS. 11-12.

FIGS. 11-13 are included to show that the jackwire frame 113, 121, 131 and 141 of FIGS. 6-10 may be altered, so as to be constructed in a manner similar to other jackwire frames known in the art, or as yet to be deployed. The jack 149 and jackwire frame 151 of FIGS. 11-13 is constructed in accordance with the Assignee's prior U.S. Pat. No. 9,537,273, which includes a dielectric support member 153. However, by bending the contact terminals A-H into different configurations, it is possible to place one or more of the engagement portions a-h of contact terminals A-H closer to the opening of the jack 149 and hence enjoy the advantages of the present invention.

In FIGS. 11-13, secondary contact terminals B and G have second engagement portions b and g which are located closer to the opening of the jack 149, as compared to second engagement portions a, c, d, e, f and h of primary contact terminals A, C, D, E, F and H. This represents a two stage system, whereby a single positive contact terminal B and a single negative contact terminal G are positioned as secondary contact terminals with engagement portions b and g closer to the plane of the opening of the jack 149, similar to the two stage system of FIG. 7. As best seen in FIG. 13, the second engagement portions b and g are hardened, i.e., formed of the second material, whereas the remaining portions of the jackwire frame 151 may be formed of the first material.

Although the jackwire frames 113, 121, 131, 141 and 151 and jack housings 103 and 149 shown in FIGS. 6-13 fit the standards for an RJ45 jack, the jackwire frames and jack housings could be modified to suit other RJ-type configurations, such as the RJ11 or RJ50 configuration.

Figure 14:
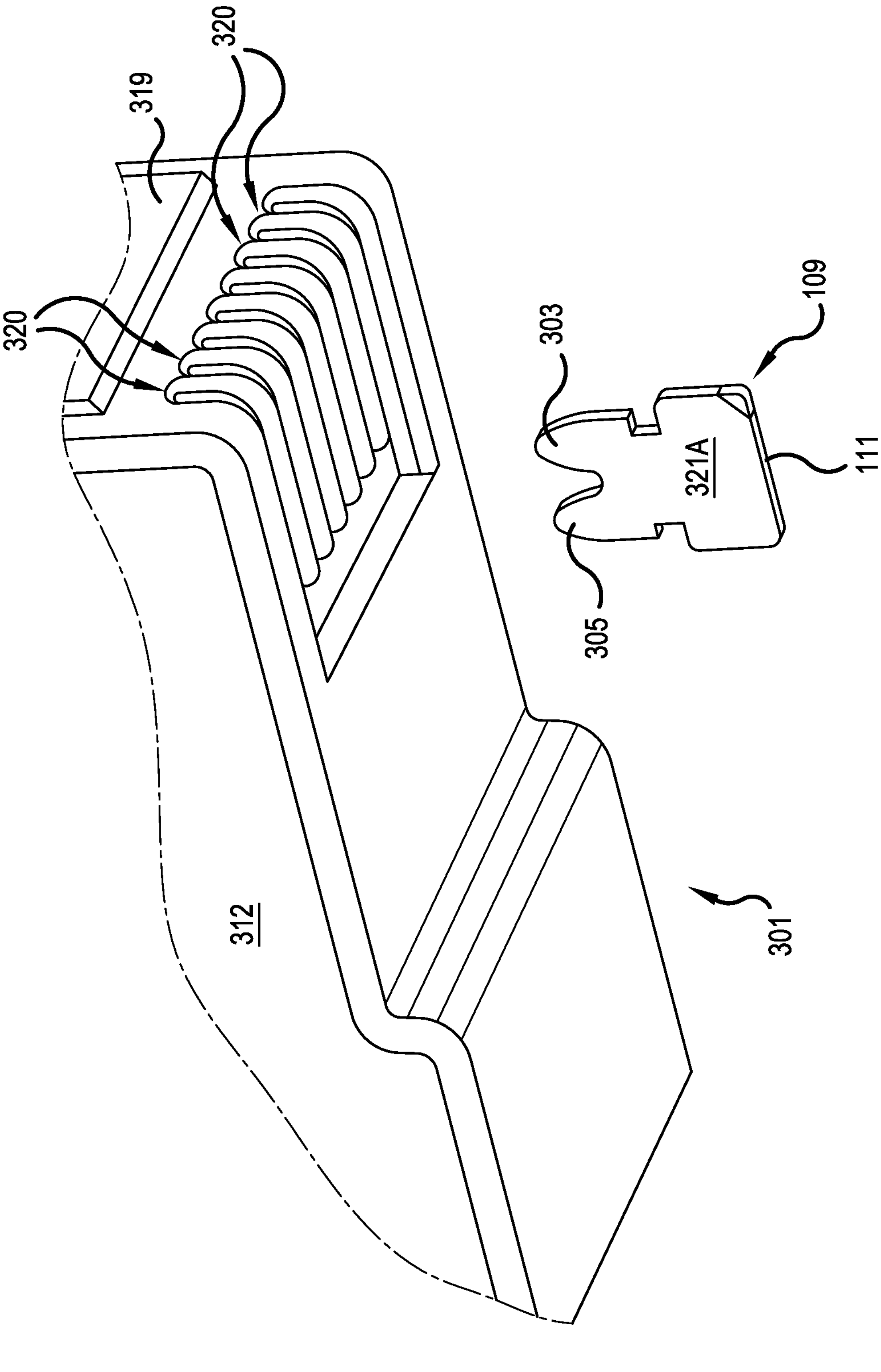
FIG. 14 is a perspective view of an improved blade, in accordance with the present invention, prior to insertion into the RJ45 plug.

Now with reference to FIGS. 14-22, a new RJ plug 301 will be described, which is in accordance with the present invention. FIG. 14 is a perspective view of the new RJ plug 301, which resists damage due to PoE sparks. The RJ plug 301 includes a plug housing 312. The plug housing 312 is preferably formed of a non-conductive dielectric material, such as plastic. A front nose 319 is formed on the plug housing 312 and is adapted to be inserted into a traditional RJ jack (not shown in FIG. 14).

Figure 15:
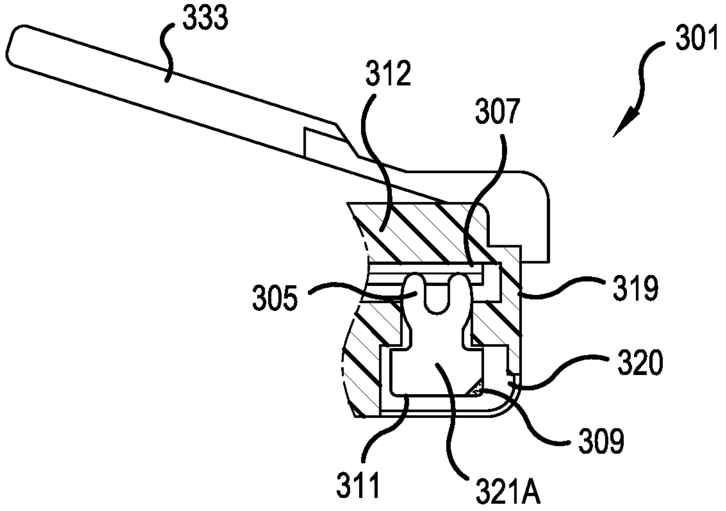
FIG. 15 is a cross sectional view of a front nose portion of the RJ45 plug of FIG. 14 in an assembled state and showing a blade within the RJ45 plug.

A latch 333 is located on a first side of the plug housing 312, as best seen in FIG. 15. The latch 333 is resiliently deflectable and adapted to engage with a structure within the traditional RJ jack to hold the plug housing 312 within the traditional RJ jack. Although the plug housing 312 shown in FIG. 14 is for a standard RJ45 plug, the plug housing 312 could be modified to suit other RJ-type configurations, such as the RJ11 configuration.

A plurality of channels 320 are formed in a second side of the plug housing 312, opposite to the first side. A plurality of blades 321A are held within the plurality of channels 320, with one blade 321A in each channel 320. In FIG. 14, the plurality of channels 320 is formed by exactly eight channels, and the plurality of blades is formed by exactly eight blades, with one blade in each channel, which conforms to the typical RJ45 plug standard. Other than the blades 321A, the RJ plug 301 may be formed the same of the RJ plug described in the Assignee's prior U.S. Pat. Nos. 7,425,159 and 7,972,183.

Figure 3:
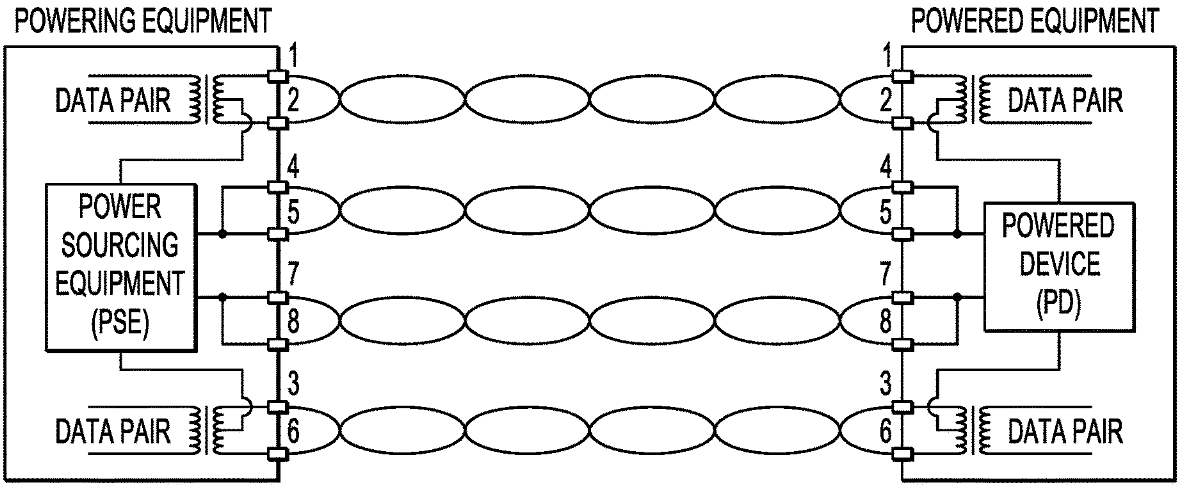
FIG.3 PRIOR ART
FIG. 3 is a schematic illustrating data flow and power flow between the PoE device and the network, in accordance with the PoE standard set forth in IEEE 802.3bt, in accordance with the prior art.

FIG. 15 is a cross sectional view of a section of the RJ plug 301 of FIG. 14 around the front nose 319 area. FIG. 3 shows the RJ plug 301 in an assembled state with a blade 321A within the RJ plug 301. Each blade 321A is formed of a conductive material and includes at least one first portion 303 and/or 305 to conduct electrical signals and/or power between the blade 321A and an insulated wire 307 within a cable or cord attached to the plug housing 312. In FIGS. 14-15, the at least one first portion 303 and/or 305 is illustrated as two sharp projections designed to penetrate an insulation layer of the insulated wire 307 and establish an electrical connection with a conductor within the insulated wire 307.

Figure 16:
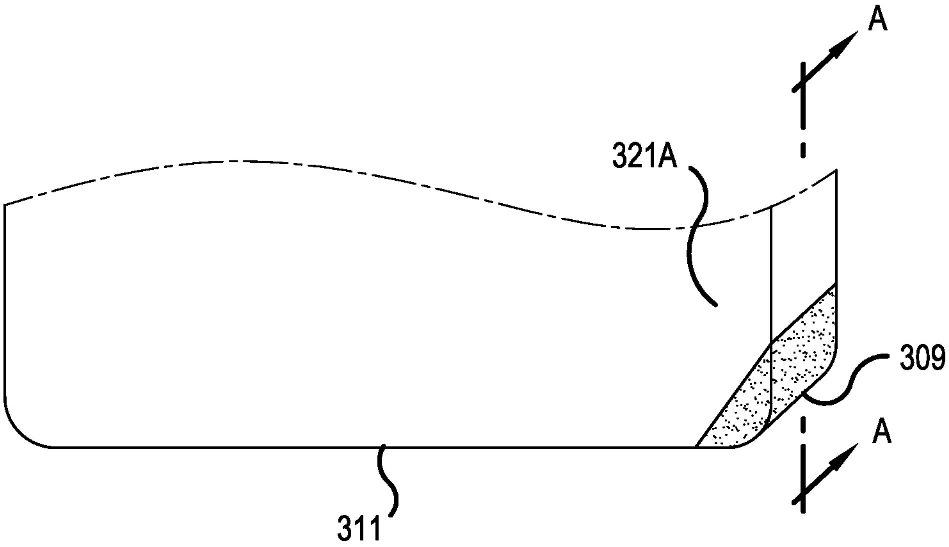
FIG. 16 is a close-up, perspective view of a forward contact edge of the blade of FIGS. 14 and 15.

FIG. 16 is a close-up, perspective view of a forward contact edge of the blade 321A of FIGS. 14 and 15. Each blade 321A includes a second portion 309 to conduct signals and/or power between the blade 321A and a contact, such as a jack wire, within the traditional RJ jack and a third portion 311 to conduct signals and/or power between the blade 321A and the same contact, e.g., the same jack wire, within the traditional RJ jack. The second portion 309 of the blade 321A is closer to the front nose 319 of the plug housing 312, as compared to the third portion 311 of the blade 321A, as best seen in FIG. 15.

Now with reference to FIGS. 17 and 18 potential material compositions of the second portion 309 will be described. In both instances, the second portion 309 of the blade 321A is formed of a conductive material which is different from the third portion 311 of the blade 321A.

Figure 17:
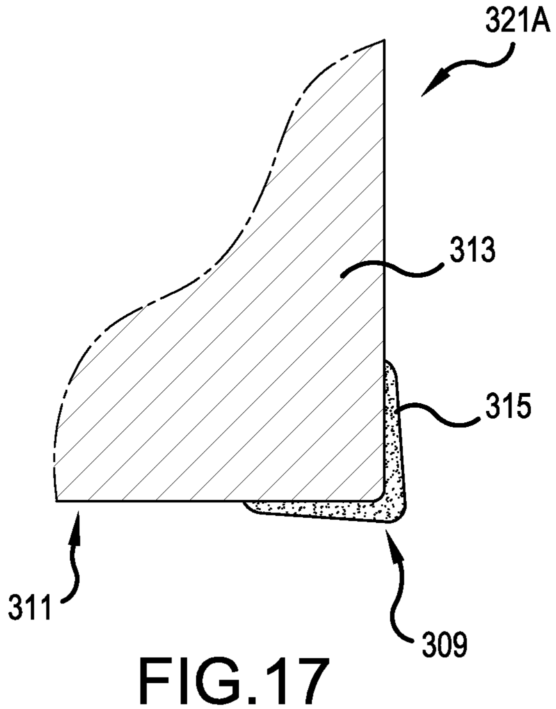
FIG. 17 is a cross sectional view taken along line A-A in FIG. 16 illustrating a material composition of the blade, in accordance with a first embodiment of the present invention.

FIG. 17 is a cross sectional view taken along line A-A in FIG. 16, illustrating a material composition of the blade, in accordance with a first embodiment of the present invention. The central section 313 of the blade 321A is formed of a highly conductive metal, like copper or a copper alloy. A semiconducting layer 315 is applied over the highly conductive metal at the second portion 309. The semiconducting layer 315 may be formed of a semiconducting material, like graphite or carbon. The third portion 311 is simply the highly conductive metal, which forms the central section 313.

Figure 18:
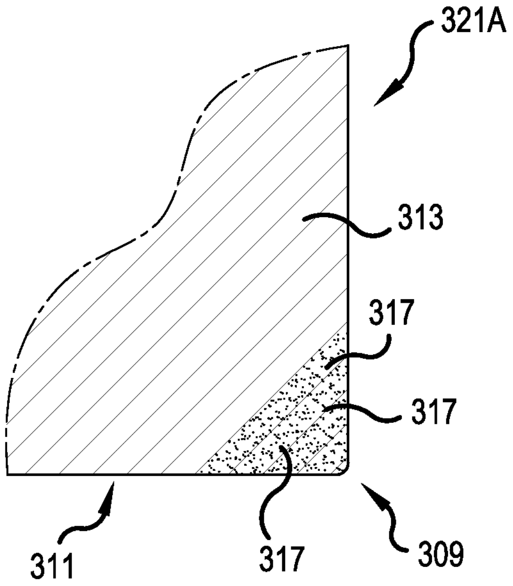
FIG. 18 is a cross sectional view taken along line A-A in FIG. 16 illustrating a material composition of the blade, in accordance with a second embodiment of the present invention.

FIG. 18 is a cross sectional view taken along line A-A in FIG. 16, illustrating a material composition of the blade, in accordance with a second embodiment of the present invention. The central section 313 of the blade 321A is formed of a highly conductive metal, like copper or a copper alloy. Semiconducting particles 317 are doped or distributed throughout the highly conductive metal in the area of the second portion 309. The semiconducting particles 317 may be formed of a semiconducting material, like graphite or carbon. The third portion 311 is simply the highly conductive metal, which forms the central section 313. Hence, the conductive material within the second portion 309 has a higher electrical resistance per unit volume as compared to an electrical resistance per same unit volume of conductive material located within the third portion 311 of the blade 321A.

Figure 19:
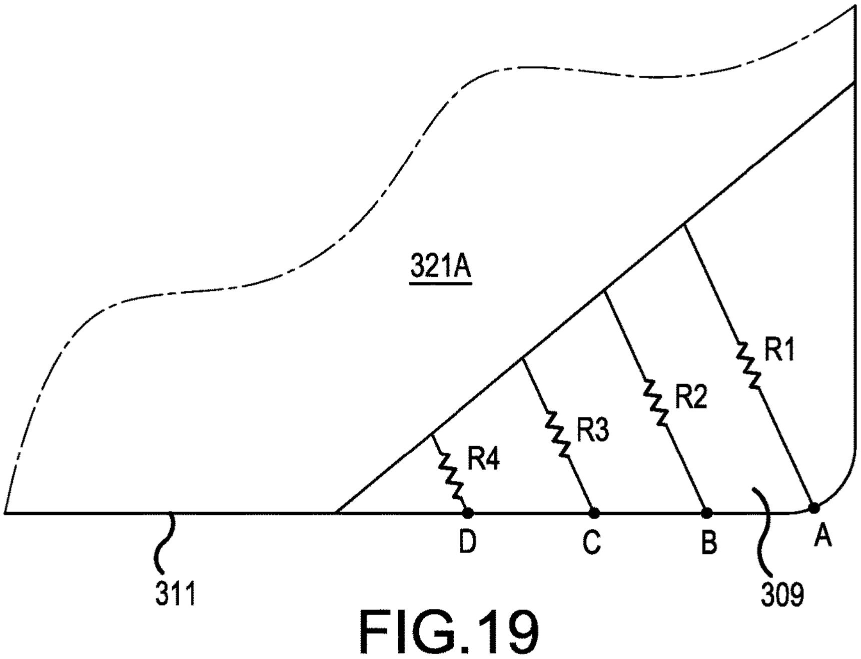
FIG. 19 is a graphic representation of the various resistances across the blade of FIGS. 14-18.

The semiconducting layer 315 or semiconducting particles 317 introduce a higher, but not infinite, resistance to inhibit sparks and arcing when an electrical connection between the second portion 309 and a jack wire is broken. FIG. 19 is a graphic representation of the various resistances across the blade 321A of FIGS. 14-18 along various paths within the second portion 309. Considering points A-DE in FIG. 19, when the RJ plug 301 is first introduced into the RJ jack, the jack wire is in contact with position A on the blade 321A and the resistance across the second portion 309 is R1. As the RJ plug 301 is pushed further into the RJ jack, the jack wire contacts point B on the blade 321A and the resistance across the second portion 309 is R2. R2 is less than R1.

As the RJ plug 301 moves further and further into the RJ jack, the point of contact between the jack wire and the blade 321A moves to points C and D, having resistances across the second portion 309 of R3 and R4, respectively. Since less and less area of the semiconducting layer 315 or semiconducting particles 317 is involved in the conduction path across the second portion 309, R1 is greater than R2, which is greater than R3, which is greater than R4. Hence, the resistance value through the blade 321A between second portion 309 and the first portion 303 and/or 305 is increased at areas of the second portion 309 nearer the nose 319 of the plug housing 312 as compared to areas of the second portion 309 more remote from the nose 319 of the plug housing 312.

Eventually, the jack wire comes into contact with the third portion 311 of the blade 321A at which time the second portion 309 no longer introduces any additional resistance to the electrical connection between the jack wire and the blade 321A. It is at this point that the latch 333 of the RG plug 301 engages the structure within the RJ jack to mate the RJ plug 301 to the RJ jack.

Due to the material composition of the second portion 309 in FIGS. 17 and 18, a first electrical resistance value through the blade 321A between the second portion 309 and the first portion 303 and/or 305 is greater by at least 5% as compared to a second electrical resistance value through the blade 321A between the third portion 311 and the first portion 303 and/or 305. More preferably, the first electrical resistance value is at least 15% greater than the second electrical resistance value, such as about 25% greater or 40% greater.

To summarize the operation, during disengagement of the RJ plug 301 from the RJ jack, the second portion 309 is positioned to be the final portion of the blade 321A to make an electrical connection to the jack wire within the RJ jack. During mating of the RJ plug 301 to the RJ jack, the second portion 309 is position to be the initial portion of the blade 321A to make an electrical connection to the jack wire within the RJ jack. Finally, the third portion 311 is positioned to be the portion of the blade 321A making an electrical connection to the jack wire within the RJ jack while the RJ plug 301 is mated within the RJ jack.

Figure 20:
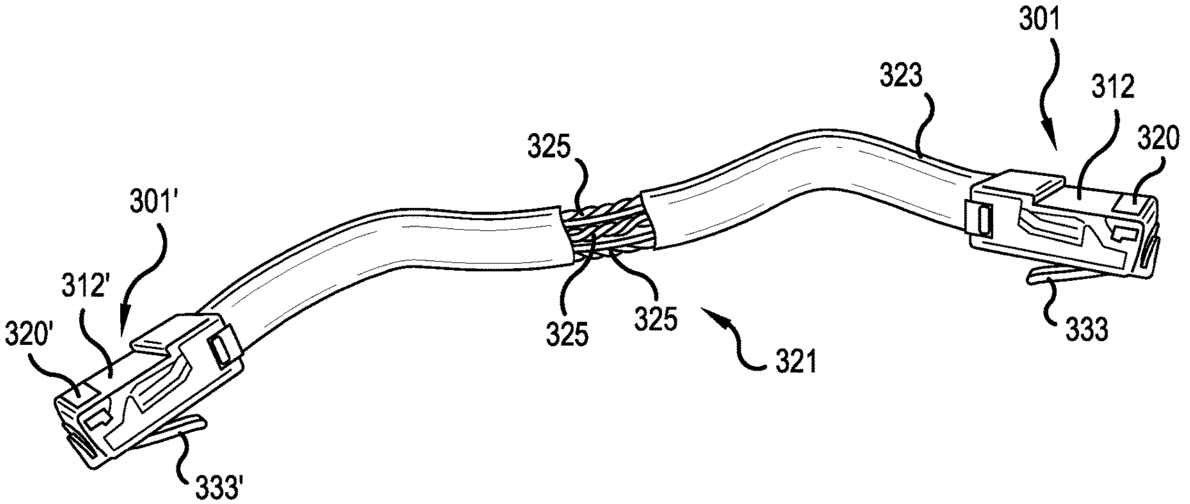
FIG. 20 is a perspective view of a patch cord in accordance with the present invention.

FIG. 20 is a perspective view of a patch cord 321 in accordance with the present invention. The patch cord 321 has a first RJ plug 301 with a first plug housing 312 and a second RJ plug 301' with a second plug housing 312'. A segment of twisted pair cable 323, having four twisted pairs 325 therein, connects the first plug housing 312 to the second plug housing 312'. The first and second RJ plugs 301 and 301' are constructed in accordance with the embodiments described above in connection with FIG. 14-19.

FIGS. 14-20 have depicted RJ plugs 301 having a blade 321A with a shape as best seen in FIG. 14. However, it is known in the existing arts to provide RJ plugs with blades having different shapes. For example, the Assignee's prior U.S. Pat. Nos. 5,975,936 and 9,819,124, which are herein incorporated by reference, teach RJ plug designs with alternative shapes for the blades.

Figure 21:
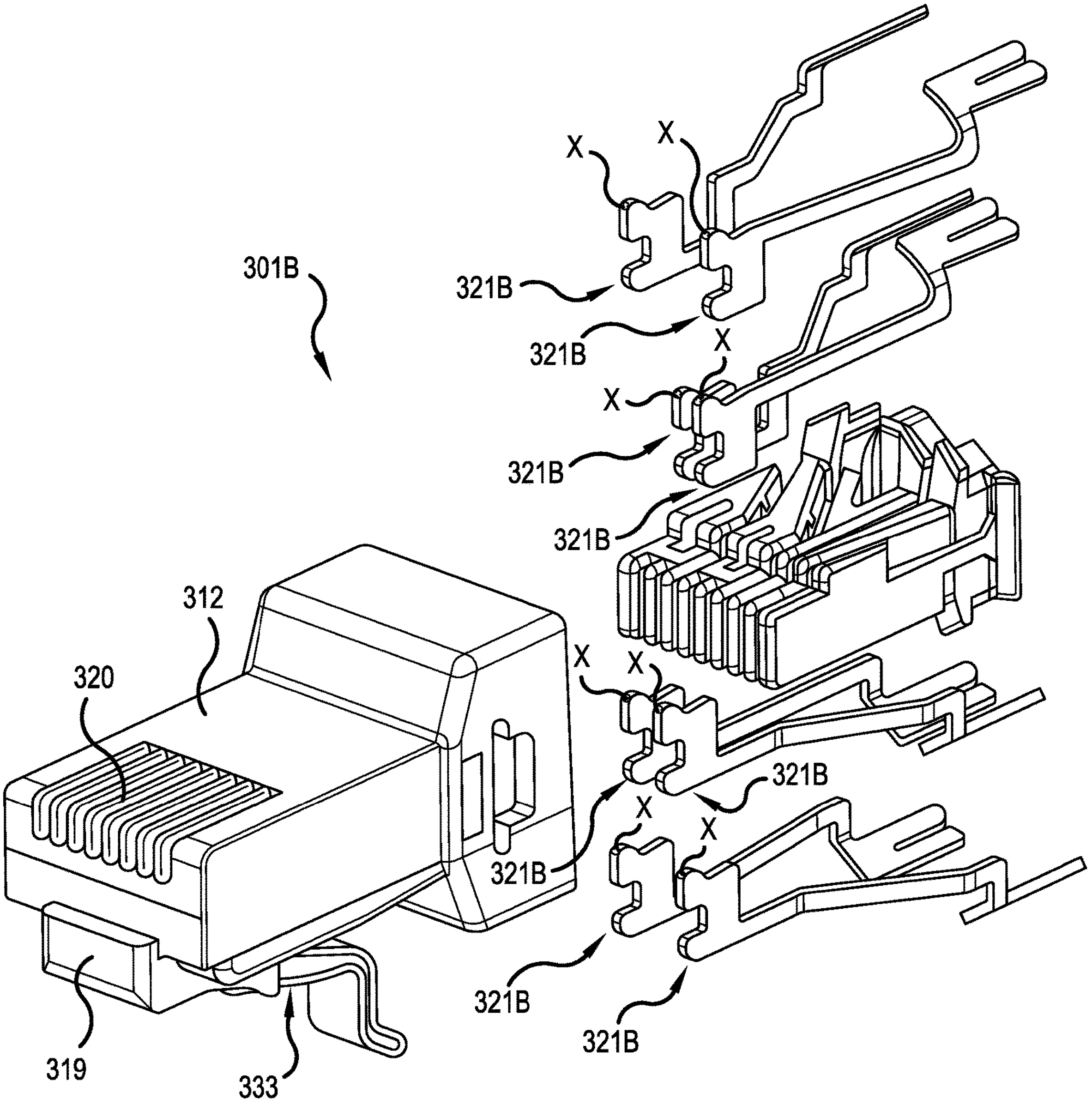
FIG. 21 is a perspective view of a different RJ45 plug having blades, in accordance with the present invention.

FIG. 21 shows the configuration of a different RJ plug 301B with blades 321B in accordance with U.S. Pat. No. 5,975,936. Reference letter X has been added to show the placements of the second portions 309 where the semiconducting layers 315 or the semiconducting particles 317 have been added to suppress sparks and arcing.

Figure 22:
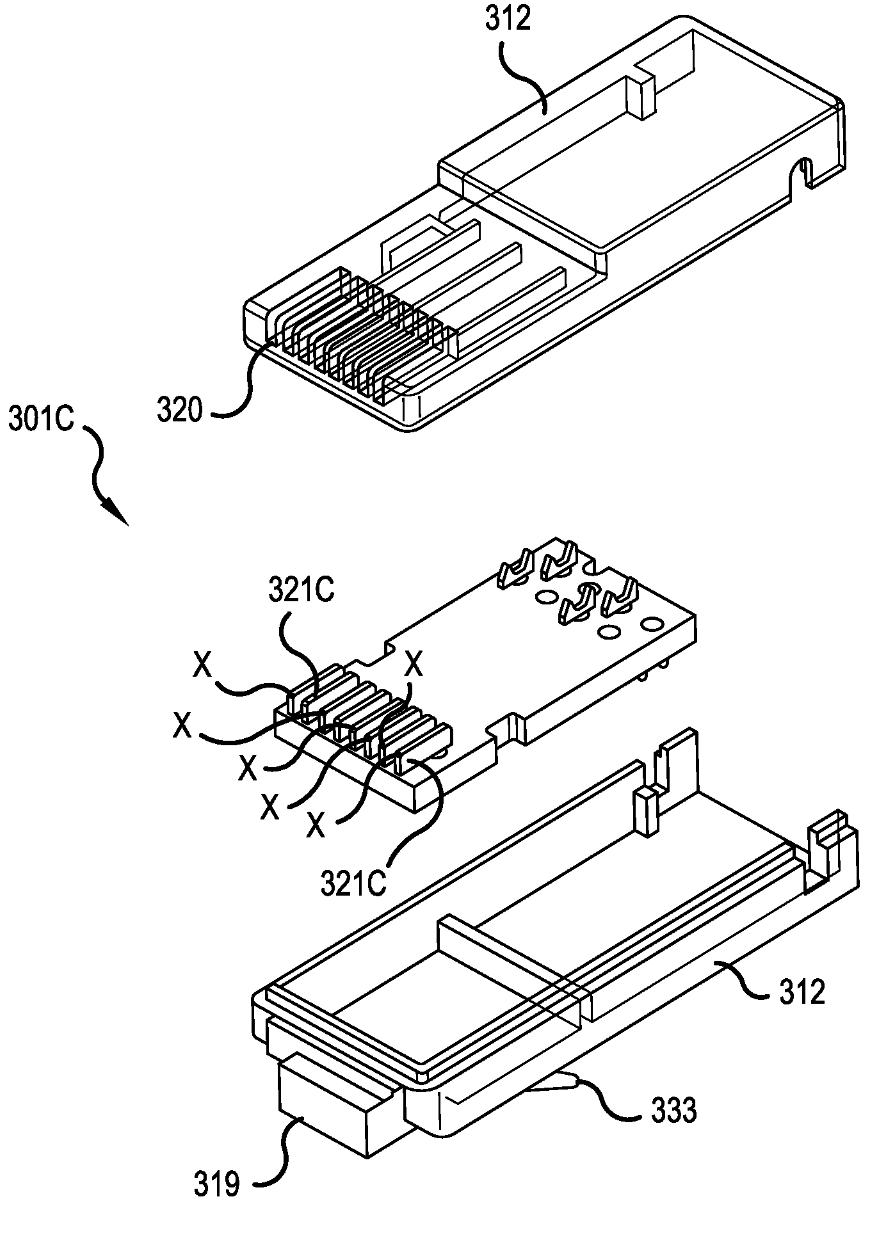
FIG. 22 is a perspective view of yet another RJ45 plug having blades, in accordance with the present invention.

FIG. 22 shows the configuration of a different RJ plug 301C with blades 321C in accordance with U.S. Pat. No. 9,819,124. Reference letter X has been added to show the placements of the second portions 309 where the semiconducting layers 315 or the semiconducting particles 317 have been added to suppress sparks and arcing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. An RJ jack comprising:

a jack housing;

an opening formed in the jack housing adapted to accept an RJ plug;

a latch catch formed on a first side within said opening of said jack housing to retain a latch of the RJ plug; and a plurality of contact terminals formed for signal transmission on a second side within said opening of said jack housing, each contact terminal formed to make electrical contact with a corresponding conductive blade of the RJ plug, wherein said plurality of contact terminals includes at least two primary contact terminals which have first engagement portions positioned at least a first distance from a plane of said opening, wherein said first engagement portions of said at least two primary contact terminals are the last portions of said at least two primary contact terminals to make electrical contact with corresponding blades of the RJ plug upon removal of the RJ plug from said opening of said jack housing, and wherein said plurality of contact terminals includes at least two secondary contact terminals having second engagement portions which are positioned less than said first distance from the plane of said opening, wherein said second engagement portions of said at least two secondary contact terminals are the last portions of said at least two secondary contact terminals to make electrical contact with corresponding blades of the RJ plug upon removal of the RJ plug from said opening of said jack housing, wherein said second engagement portions of said at least two secondary contact terminals break electrical contact with their corresponding blades of the RJ plug after electrical contact has been broken between said first engagement portions of said at least two primary contact terminals and their corresponding blades of the RJ plug, and wherein a first of said first engagement portions is formed of a first material different from a second material used to form a first of said second engagement portions.

2. The RJ jack according to claim 1, wherein said second material resists damage from sparks or arcs better than said first material.

3. The RJ jack according to claim 2, wherein a second of said second engagement portions is made of said second material.

4. The RJ jack according to claim 3, wherein said at least two primary contact terminals includes six primary contact terminals, and said first engagement portions of all of said six primary contact terminals are made of said first material.

5. The RJ jack according to claim 2, wherein said first material is a base metal with a gold plating, and wherein said second material is said base metal with a thicker gold plating.

6. The RJ jack according to claim 2, wherein said first material is a base metal with a gold plating, and wherein said second material is said base metal with a silver plating.

7. The RJ jack according to claim 2, wherein said second material includes a beryllium-copper alloy, and wherein said first material does not include a beryllium-copper alloy.

8. The RJ jack according to claim 2, wherein said second material includes a nickel alloy or a phosphorous bronze alloy.

9. The RJ jack according to claim 1, wherein said plurality of contact terminals are formed by resilient jackwires.

10. The RJ jack according to claim 1, wherein said at least two primary contact terminals is four primary contact terminals in a first group, and wherein said at least two secondary contact terminals is four secondary contact terminals in a second group.

11. The RJ jack according to claim 10, wherein said first group is either I or II, where I is contact terminals 1, 2, 4 and 5 within said opening of said jack housing, and where II is contact terminals 3, 6, 7 and 8 within said opening of said jack housing, and wherein said second group is the other of I or II.

12. The RJ jack according to claim 11, wherein said first material resists damage from sparks or arcs better than said second material.

13. The RJ jack according to claim 12, wherein all of said first engagement portions are formed of said first material and all of said second engagement portions are formed of said second material.

14. An RJ jack comprising:
- a jack housing;
- an opening formed in the jack housing adapted to accept an RJ plug;
- a latch catch formed on a first side within said opening of said jack housing to retain a latch of the RJ plug; and
- a plurality of contact terminals formed on a second side within said opening of said jack housing, each contact terminal formed to make electrical contact with a corresponding conductive blade of the RJ plug,
- wherein said plurality of contact terminals includes at least two primary contact terminals which have first engagement portions positioned at least a first distance from a plane of said opening, wherein said first engagement portions of said at least two primary contact terminals are the last portions of said at least two primary contact terminals to make electrical contact with corresponding blades of the RJ plug upon removal of the RJ plug from said opening,
- wherein said plurality of contact terminals includes a secondary contact terminal having a second engagement portion which is positioned at a second distance, less than said first distance, from said plane of said opening, wherein said second engagement portion of said secondary contact terminal is the last portion of said secondary contact terminal to make electrical contact with a corresponding blade of the RJ plug upon removal of the RJ plug from said opening, and
- wherein said plurality of contact terminals includes a tertiary contact terminal having a third engagement portion which is positioned at a third distance, less than said second distance, from said plane of said opening, wherein said third engagement portion of said tertiary contact terminal is the last portion of said tertiary contact terminal to make electrical contact with a corresponding blade of the RJ plug upon removal of the RJ plug from said opening, wherein during removal of the RJ plug from said opening, said third engagement portion of said tertiary contact terminal breaks electrical contact with its corresponding blade of the RJ plug after electrical contact has been broken between said second engagement portion of said secondary contact terminal and its corresponding blade of the RJ plug, wherein said second engagement portion of said secondary contact terminal breaks electrical contact with its corresponding blade of the RJ plug after electrical contact has been broken between said first engagement portions of said at least two primary contact terminals and their corresponding blades of the RJ plug, wherein said first engagement portions and said third engagement portion are formed of a first material and said second engagement portion is formed of a second material different from said first material, and wherein said second material resists damage from sparks or arcs better than said first material.

15. The RJ jack according to claim 14, wherein said contact terminals are formed by resilient jackwires.

16. An RJ jack comprising:
- a jack housing;
- an opening formed in the jack housing adapted to accept an RJ plug;
- a latch catch formed on a first side within said opening of said jack housing to retain a latch of the RJ plug; and
- eight contact terminals formed on a second side within said opening of said jack housing, each contact terminal formed to make electrical contact with a corresponding conductive blade of the RJ plug, wherein said plurality of contact terminals includes exactly two displaced contact terminals placed within the opening of said jack to always be the last two contact terminals of said eight contact terminals to make electric contact with the conductive blades of the RJ plug when the RJ plug is being withdrawn from the opening of said RJ jack, wherein at least one of said two displaced contact terminals is formed of a material which resists damage from sparks or arcs better than a different material used to form the remaining six contact terminals.

17. The RJ jack according to claim 14, wherein said at least two primary contact terminals is four primary contact terminals.

18. The RJ jack according to claim 14, wherein said second material is said base metal with a silver plating.

19. The RJ jack according to claim 14, wherein said second material includes a beryllium-copper alloy, and wherein said first material does not include a beryllium-copper alloy.

20. The RJ jack according to 14, wherein said second material includes a nickel alloy or a phosphorous bronze alloy.

* * * * *